(12) United States Patent
Smith

(10) Patent No.: US 9,329,011 B1
(45) Date of Patent: May 3, 2016

(54) HIGH VOLTAGE ARM/FIRE DEVICE AND METHOD

(75) Inventor: Fred M. Smith, LaVale, MD (US)

(73) Assignee: Orbital ATK, Inc., Plymouth, MN (US)

( * ) Notice: Subject to any disclaimer, the term of this patent is extended or adjusted under 35 U.S.C. 154(b) by 3919 days.

(21) Appl. No.: 09/795,690

(22) Filed: Feb. 28, 2001

(51) Int. Cl.
*F42C 19/12* (2006.01)
*F02K 9/95* (2006.01)
*F42B 3/14* (2006.01)
*F42C 19/08* (2006.01)

(52) U.S. Cl.
CPC . *F42C 19/12* (2013.01); *F02K 9/95* (2013.01); *F42B 3/14* (2013.01); *F42C 19/0819* (2013.01)

(58) Field of Classification Search
CPC .......... F42C 11/00; F42C 19/00; F42C 19/08; F42C 19/12; F42C 19/0819; F42C 19/0823; F42C 19/0838; F02K 9/95; F42B 3/10; F42B 3/14
USPC ................. 102/200, 202, 202.5, 202.8, 202.9
See application file for complete search history.

(56) References Cited

U.S. PATENT DOCUMENTS

| 319,628 | A | * | 6/1885 | Russell ...................... 102/202.8 |
| 3,408,937 | A | | 11/1968 | Lewis et al. |
| 3,422,763 | A | * | 1/1969 | Wait .............................. 102/202 |
| 3,618,526 | A | | 9/1969 | Baker |
| 3,726,217 | A | * | 4/1973 | Dedman et al. ............. 102/28 R |
| 3,754,506 | A | * | 8/1973 | Parker .......................... 102/28 R |
| 4,046,076 | A | * | 9/1977 | Hampton .................. 102/70.2 A |
| 4,047,483 | A | | 9/1977 | Williams |
| 4,391,195 | A | | 7/1983 | Shann |
| 4,503,773 | A | | 3/1985 | Bolieau |
| 4,539,910 | A | | 9/1985 | Stevens |
| 4,608,926 | A | | 9/1986 | Stevens |
| 4,660,472 | A | | 4/1987 | Stevens |
| 4,862,802 | A | | 9/1989 | Streifer et al. |
| 4,892,037 | A | | 1/1990 | Betts |
| 4,917,014 | A | | 4/1990 | Loughry et al. |
| 4,984,518 | A | | 1/1991 | Yarrington |
| 5,022,324 | A | | 6/1991 | Rice, Jr. |
| 5,099,761 | A | | 3/1992 | Betts et al. |
| 5,144,893 | A | | 9/1992 | Zeman et al. |
| 5,179,246 | A | | 1/1993 | Betts et al. |
| 5,204,491 | A | | 4/1993 | Aureal et al. |

(Continued)

FOREIGN PATENT DOCUMENTS

WO    WO 97/22571    6/1997

OTHER PUBLICATIONS

*Propellants*, pp. 42-46, http://www.hq.nasa.gov/office/pao/History/conghand/propelnt.htm.

(Continued)

*Primary Examiner* — James S Bergin
(74) *Attorney, Agent, or Firm* — TraskBritt

(57) ABSTRACT

An apparatus and method for initiating the ignition of a pyrotechnic material in a controlled manner. The invention is suitable for use with less sensitive pyrotechnic material or charges, such as, but not limited to, boron potassium nitrate ($B/KNO_3$) and nitrocellulose (NC). The invention is particularly suitable for incorporation with an ignition system for the ignition of pyrotechnic materials used in solid propellant missile and rocket motors. The invention is particularly resistant to spurious radio frequency interference and/or other electromagnetic interference and is readily capable of operating on a minimum fire or triggering voltage in excess of 500 volts.

77 Claims, 8 Drawing Sheets

(56) References Cited

U.S. PATENT DOCUMENTS

| | | |
|---|---|---|
| 5,206,455 A | 4/1993 | Williams et al. |
| 5,220,783 A | 6/1993 | Cherry et al. |
| H1214 H | 8/1993 | Liva et al. |
| 5,413,045 A | 5/1995 | Miszewski |
| 5,431,100 A | 7/1995 | Snyder |
| 5,431,101 A | 7/1995 | Arrell, Jr. et al. |
| 5,485,788 A | 1/1996 | Corney |
| 5,576,509 A | 11/1996 | Refouvelet et al. |
| 5,675,966 A | 10/1997 | Dombrowski et al. |
| 5,959,236 A | 9/1999 | Smith et al. |
| 6,047,643 A | 4/2000 | Benner et al. |
| 6,205,927 B1 * | 3/2001 | Findley .......... 102/472 |
| 6,260,483 B1 * | 7/2001 | Snyder .......... 102/218 |

OTHER PUBLICATIONS

*Rocket Propellants*, p. 1, http://www.bestofcolumbus.com/braeunig/space/propel.htm.

"Ballistic Missile Basics," *Federation of American Scientists, Special Weapons Primer*, http://www.fas.org/nuke/intro/missile/basics.htm.

* cited by examiner

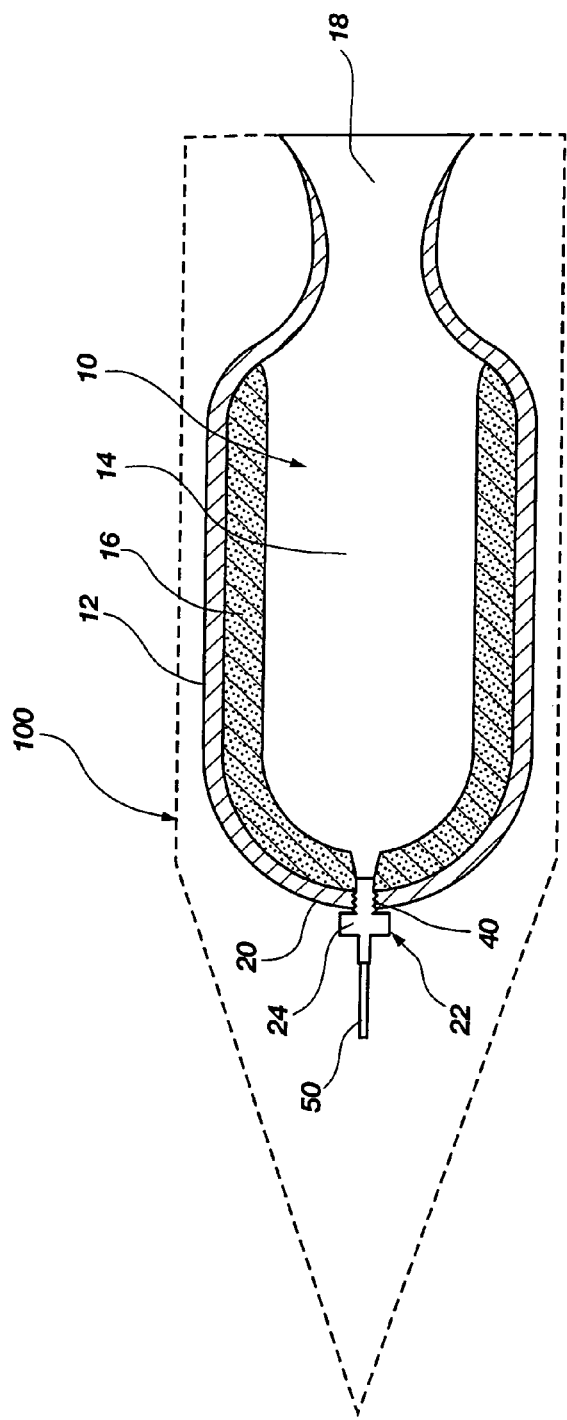
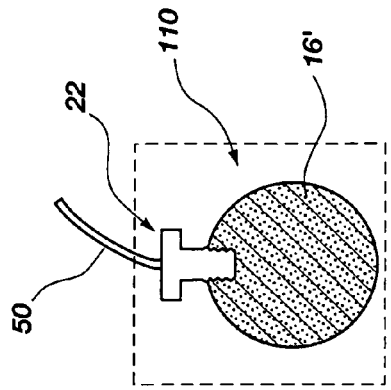
Fig. 1A
Fig. 1B

HIGH VOLTAGE ARM/FIRE DEVICE AND METHOD

BACKGROUND

This invention generally relates to electro-initiation/detonation devices and methods for initiating the ignition of a pyrotechnic material. More specifically, this invention is particularly suitable for initiating the ignition of solid chemical composite propellants such as, but not limited to, initiating the ignition of boron mixed with potassium nitrate ($B/KNO_3$) which, in turn, may be used to ignite the primary propellant of a rocket motor.

In order to ignite a pyrotechnic material such as, but not limited to, a solid propellant used in rockets, missiles, and launch vehicles, an initiator, containing a small quantity of confined pyrotechnic material, is typically used for initializing intermediate thermal energy positioning, boosting and heat spreading pyrotechnic structures, the functional conclusion of which leads to ignition of the primary pyrotechnic material in a satisfactory manor. As known within the art, an initiator, upon receiving a prescribed electrical, optical, thermal, or mechanical energy input, may be generally classified in one of two general types of initiators. The first type or style of initiator may, generally speaking, be referred to as a deflagratory type initiator in which the initial charge of pyrotechnic material burns in an extremely rapid and preferably extremely efficient manner but which does not burn in what could be characterized as an detonative, explosive, or violent manner. The second general type of initiator may generally be referred to as a detonative type or detonator in which the initial charge of pyrotechnic material explodes violently and often destructively. In some applications, an initiator or a detonator may work essentially equally as well for ignition of the main charge of pyrotechnic material as it may not be critical if the main charge is ignited in a detonative manner or if it is initiated in a relatively less violent, deflagratory manner. However, in other applications, it may be desired or required that the pyrotechnic material of the initiator burn extremely rapidly and efficiently, but do so without detonating or exploding. In yet other applications, it may be preferred or required that the initial charge of pyrotechnic material ignite in a detonative manner so as to properly trigger the main or primary charge, or alternatively a train of multiple charges of a given detonative device, system, or arrangement. Alternatively, an initiator or detonator, often referred to collectively as an ignition system by those skilled in the art, may be used to trigger a sequential ignition of a plurality of charges consisting of various pyrotechnic materials and configurations which ultimately ignites or detonates one or more main charges of pyrotechnic material. Such a preplanned, sequential ignition of one or more intermediate pyrotechnical charges is often referred to as a "pyrotechnic train," or simply as a "train."

Thus, when an initiator is used to ignite, for example, a solid propellant rocket or missile motor, the initiator, upon receiving a predetermined pulse of energy from an "arm and fire signal processing device," will cause the pyrotechnic material contained within the initiator to combust. This event is typically not sufficiently energetic to ignite the solid propellant of the rocket motor directly without excessive uncertainty and, therefore, requires thermal power boosting through a pyrotechnic train, usually deflagratorily. The burning solid propellant will then provide a thrust profile, predictably positioned in time, designed to propel the missile, rocket, or vehicle along its planned trajectory. Upon the initiator receiving the input to fire the missile, the ignition process will typically occur in well under a second, with those skilled in the art measuring the ignition process in at least milliseconds and often in microseconds.

Regardless of whether a primary charge is to be ignited by one or more initial, or precursor charges in a degflagratory manner, or whether a primary charge is to be ignited by one or more initial or precursor charges in a detonative manner, the functional embodiment of the ignition initiator must be extremely resistant to accidental functioning. The initiator must be maximally immune to functioning by spurious electromagnetic energy and other signal and power sources indigenous to the military environment because of the unforgiving nature of pyrotechnic devices, which could inadvertently initiate or detonate the main or primary charge of pyrotechnic material.

The art is replete with a number of types of initiators and detonators, which are collectively referred to herein as initiators unless otherwise specified. The art is also replete with a wide number and variety of pyrotechnic materials used within initiators. Two of the most generally favored types of initiators are those which are actuated by electrical current, i.e., having electrical leads connected to an electrical resistance element that ignites the initiator pyrotechnic, and those which are optically actuated, i.e., having lasers or pumped laser-rods that project light through an optical fiber at an energy level sufficient to ignite the pyrotechnic material.

Representative and currently favored types of pyrotechnic materials used in initiators are boron potassium nitrate ($B/KNO_3$), zirconium potassium perchlorate ($Zr/KClO_4$) and nitrocellulose (abbreviated NC). Other fuels/oxidizers used in prior art initiators include magnesium (Mg), aluminum (Al), magnesium-polytetrafluoroetheylene (Mg-PTFE) and other metal-based fuels mixed with selected oxidants. Furthermore, it is common for small volumes of plasticizers and carbon black to be mixed into the pyrotechnic as needed for a particular application.

Solid propellants may include any of the above materials, as well as more conventional propellants such as smokeless powder, black powder, or more modern solid propellant grains known within the art including, but not limited to, nitrocellulose (NC), nitrocellulose/nitroglycerine ($NC/C_3H_5(NO_3)_3$), and ammonium perchlorate ($NH_4ClO_4$) based solid grain propellants.

It is well known in the art that a detonating or deflagrating ignition device or system utilizing an exploding bridge wire may be used to fire a rocket or a missile motor. Upon such a prior art bridgewire detonating device being ignited by an electrical current being applied to the resistive bridge wire, it rapidly heats to a temperature sufficiently high enough to explode and thereby ignite the pyrotechnic material. Although effective, such an activation scheme is prone to a number of problematic characteristics. One such potential problem is the accidental activation of the initiator by way of spurious or stray radio frequency interference (RFI), electromagnetic interference (EMI), electrostatic discharge (ESD), lightning effects (LE), electromagnetic pulse (EMP), power supply transients (PST), or other incidental and interfering energy being present, collectively referred to herein as spurious EMI, of such a magnitude that the initiator is inadvertently activated. Spurious EMI susceptibility may be quite serious whether in a commercial setting, such as where construction, demolition, or mining is taking place, or other areas in which spurious EMI activity could, or does, exist. Also, such spurious EMI susceptibility may not be tolerated in certain environments where a wide variety of spurious and EMI activity occurs as a matter of course.

Another characteristic of some prior art initiators that may be problematic is that the pyrotechnic material may be subject to unwanted "conditioning" upon being exposed to electrical current at a level too low to cause ignition. This conditioning may, in certain circumstances, unacceptably modify the future firing characteristics of the pyrotechnic material. That is, it is known that in some initiator arrangements, the pyrotechnic material or charge may be subjected to one or more exposures of electrical energy at a magnitude which do not cause ignition but, nonetheless, are of a magnitude which results in the pyrotechnic charge experiencing a noticeable change in its dielectric qualities. Thus, in order to actually ignite the charge after such exposure, an increased amount of current for an increased amount of time is required to successfully ignite the conditioned pyrotechnic charge as compared to a nonconditioned charge of the same pyrotechnic material. Thus, in some applications a more powerful and/or more complex ignition system may be required to ensure operational readiness as compared to what otherwise would be sufficient were the charge not subject to such unwanted conditioning.

A problem with prior art detonators which employ exploding bridge wires, is that such detonators are generally limited to ignition of pyrotechnic materials that are considered to be sensitive or relatively unstable. This is because it takes a relatively low amount of current to sufficiently energize a bridge wire to a high enough temperature to initiate the ignition of a sensitive material, but such a low (and reasonable) amount of current is not practical to adequately or reliably initiate the ignition of less sensitive pyrotechnic materials. That is, having a power supply robust and powerful enough to provide the requisite large amount of electrical current and voltage product needed to provide the high energy to function a suitable bridge wire structure often being used to detonate more stable, less sensitive pyrotechnic materials, may not be practical for initiating the ignition of solid propellant motors in air-launched missiles, easily movable and transportable ground-launched missiles, or other highly mobile launching venues and platforms.

Thus, in order for an ignition system (IS) to be of practical use regardless of the pyrotechnic material to be carried and energized within, the IS must be reliable and immune to accidental triggering so as not to create an undue or unwanted risk to personnel, yet not require a relatively large amount of electrical power that would not be practical or which would be unduly costly to have on hand. To elaborate, if an overly stable, or insensitive, pyrotechnic material is selected, the size, weight, and/or complexity of a power supply, even if augmented with capacitors and such, may not be powerful enough or operationally reliable enough to ignite the overly stable pyrotechnic material. Alternatively, even if an electrical power supply is made powerful and reliable enough, it is imperative that it not limit the practicality or versatility required for a given application such as being too heavy, too large, too complex or too fragile to be practical for initiating the ignition, for example, of a solid propellant missile motor.

One example of an ordnance initiation ignition system is disclosed in U.S. Pat. No. 5,144,893 issued to Zeman et al., which system incorporates a firing circuit connected to an electrical discharge initiation element in communication with a shock transmission tube that is, in turn, in communication with a pyrotechnic material such as $B/KNO_3$. The initiation element is provided with a pair of electrical conductors, an insulator for separating the conductors, a cover to provide support and a protective environment in which the electrical conductors terminate into an air gap and a spark gap. Upon a sufficiently high voltage or current being applied to the conductors, a shockwave is produced that ruptures a thin cover or diaphragm of plastic or paper with the shock wave propagating through the shock transmission tube, which may be lined with a secondary explosive, ultimately reaching the pyrotechnic material and igniting it. Such an air gap and spark gap arrangement offers enhanced safety because it eliminates the need to incorporate a pyrotechnic-initiating material within the immediate vicinity of the electrical discharge initiation element. However, a gap arrangement requires ignition to be performed by way of a shockwave-induced detonation, which may not be suitable for many applications such as those where a deflagratory initiation is desired or required.

As a result of the desirability of using less sensitive pyrotechnic materials within ignition systems, laser-fired initiators have been extensively developed. An early example of a laser-fired initiator is disclosed in U.S. Pat. No. 3,408,937 issued to D. J. Lewis et al. As shown and described therein, a laser, such as a gaseous laser, a ruby-rod laser, a neodymium laser, a semiconducting laser, or a chemical laser, is combined with an optical fiber into which light energy is pumped or pulsed. The optical fiber is directed into a detonator/initiator containing a pyrotechnic material such as a detonative material including dynamite, cyclotrimethylenetrinitraime (RDX), trinitrotoluene (TNT), pentaerythritol tetranitrate (PETN), mercury fulminate or a deflagratory material such as black powder, metal oxides, metallized polyurethanes, various powdered fuels, high temp and carbon oxidant mixes. Because the laser output may generate enough energy to reach temperatures on the order of 2,000° C., laser-fired initiators were widely adapted as the temperatures were high enough to detonate less sensitive pyrotechnic materials. A further benefit offered by laser or laser-rod ignition systems is that optical fibers are immune to stray EMI/RMI as well as stray optical energy.

Another example of a laser-initiated ignition system is disclosed in U.S. Pat. No. 5,206,455 issued to Williams et al. The system disclosed in Williams et al. is described as being suitable for both deflagrating initiators and deflagration-to-detonation, devices and focuses on such systems being used in flight termination systems should a rocket exceed a predetermined range or should the rocket approach or threaten a safe-guarded area. The subject ignition system includes the use of laser energy to fire both a deflagrating initiator and deflagration-to-detonation device via fiber optic cable assemblies. In a preferred embodiment, six solid state lasers are used to provide the laser energy to ignite the various self destruct charges incorporated within the flight termination system. As can be appreciated upon reviewing the Williams et al. patent, the ignition system disclosed therein is quite elaborate and sophisticated in order to provide the amount of safety and redundancy that is absolutely required in the intended applications.

Notwithstanding the proven operational characteristics and reliability of ignition systems known within the art, there is a need for ignition systems that are relatively simple yet still offer the requisite reliability, an acceptable level of EMI/RFI immunity, operational efficiency, acceptable levels of safety, highly resistant to environmental contaminates and ambient temperatures, and are practical to fabricate and operate. Furthermore, there remains a need for ignition systems that are more economical to construct and maintain, and are versatile enough to use in a variety of pyrotechnic applications and not merely within a few specific, narrow applications. For example, laser-fired ignition systems often require an optical lens to be provided and sealed with respect to a container or column of a selected pyrotechnic material so that light exiting the optical fiber may be adequately focused on the material to ignite it. Such a sealed optical lens can be difficult to construct and care must be taken that all seals are strong enough to withstand the ultimate deflagration or detonation of the pyrotechnic material, such as in missile motor applications.

In many applications, such as when stable, less sensitive pyrotechnic materials are incorporated as a propellant in missile assemblies, such stable, less sensitive pyrotechnic materials allow for the installation of an initiator at the time the missile is assembled instead of just prior to when the missile is to be readied for firing. Thus, there remains a need for an electrically activated initiator that may be incorporated within an ignition system which is especially suitable for use in connection with stable, less sensitive pyrotechnic materials, such as $B/KNO_3$ and $Zr/KClO_4$ for example, which in turn, may be used to ignite the primary propellant of a solid propellant rocket motor.

Additionally, it would be beneficial to the art if an electrically activated deflagrating initiator were available featuring a pyrotechnic material container or body structure which is easily sealed with a robust, easy to construct hermetic seal made of readily available material. Such a seal would offer a further advantage over the hermetic seals, which are often used in connection with conventional laser-fired ignition systems, which seals tend to be relatively expensive and fairly difficult to construct due to the nature of the materials used. That is, seals used in connection with optical fibers are often quite elaborate as the optical fiber(s) used with laser-fired systems must allow optical energy to readily pass into the volume of pyrotechnic material to be ignited yet the hermetic seal must be able to prevent the high pressures generated by the ignition process from destroying the seal and possibly causing mechanical and operational problems in the proximity of the ignited pyrotechnic material.

A yet further need in the art is for an ignition system incorporating simplified secondary safety features enabling the ignition system to meet various standards, regulations, and other formal requirements and mandates that may be applicable to providing an acceptable safe arm/fire ignition system used in connection with the ignition of fuel/oxidants used in solid propellant missile and rocket motors. Such applicable standards include, for example, Military Standards published and made publicly available by the United States Department of Defense (U.S. DOD). One such publicly available standard is Military Standard 1901 (MIL-STD1901) which is entitled, "Munition Rocket and Missile Motor Ignition System Design, Safety Criteria For." MIL-STD-1901 sets forth that an electrically-fired ignition system (IS), which contains only $B/KNO_3$ meeting MIL-P-46994, or other appropriately qualified and tested pyrotechnic materials in lieu of or possibly in combination with $B/KNO_3$, provided in the pyrotechnic train of the IS need not be provided with a mechanical interrupter (for example, a shutter, slider, or rotor for interrupting the pyrotechnic train). Thus, a particular ignition system incapable of being inadvertently initiated upon being subjected to an electrical potential of less than 500 volts but incorporating an electrical circuit that requires and can produce an initiation voltage preferably well in excess of the threshold 500 volts would be beneficial, if not required, for many applications so as to prevent unintentional arming and firing. Furthermore, an additional benefit of providing the industry with an electrically-activated arm/fire system which can be configured to conform with publicly available MIL-STD-1901 (Munition Rocket and Missile Motor Ignition System Design, Safety Criteria For), MIL-P-46994 (Pellets/Granules Boron/Potassium Nitrate), MIL-I-23659 (Initiators, Electric, General Design Specification For), and MIL-HDBK-1512 (Electroexplosive Subsystems, Electrically Initiated, Design Requirements and Test Methods) would, in certain applications, dispense with the added cost associated with providing an otherwise required pyrotechnic train interrupter within the design of such an electrically-fired arm/fire system.

It would further be desirable to have a small sized, laser-free and interrupter-free ignition system that could be easily tailored for use as either a bulk resistance initiator or as a dielectric breakdown initiator and which, upon being triggered, would have a minimal amount of ejecta so as to minimize the possibility of contaminating or interfering with the subsequent ignition of the pyrotechnic train or the primary charge or propellant. Furthermore, it would also be desirable to have an initiator which is intrinsically reliable, testable, relatively non-complex, exhibits a no-response immunity to voltages of less than 500 volts, and possesses a very high tolerance to temperature extremes, thermal and mechanical shock, drop testing, vibration, a sufficiently long storage life, and an acceptable post-trigger life expectancy.

BRIEF SUMMARY

The present invention encompasses an apparatus and method for direct ignition of an insensitive pyrotechnic material including, but not limited to, $BKNO_3$ and NC. The present invention is particularly suitable for providing an arm/fire device and an electrical circuit for initiating the ignition of solid propellant rocket and missile motors. An initiator body is provided that includes a micro initiation cavity or bore that is sized and configured to contain a micro initiation column of a preselected pyrotechnic material. Preferably, the micro initiation cavity is generally cylindrically shaped and has an inside diameter ranging upward of 0.01 of an inch. An electrode, preferably fabricated out of an elongated stainless steel element containing chromium and nickel, such as a wire, having an outside diameter ranging upward of 3 mils (0.003 of an inch) is disposed within the micro initiation cavity. This electrode is preferably aligned central and coaxial at the point of entry so as to make the radial distance to the companion inner cylindrical conductive surface or spacer as uniform and process-stable as possible. The portion of the electrode receiving mechanical support is preferably encompassed by a centralizing insulator with suitable mechanical and dielectric properties such as a ceramic material. A ratiometrically optimized cantilevered length of the electrode is purposely exposed beyond the end of the centralizing insulator. The exposed length may range upward of 30 mils (0.030 of an inch). The preferred ceramic insulator is constructed so as to provide a hermetic attachment about the electrode so as to seal the electrode passageway. This seal prevents foreign molecular intrusion upon the pyrotechnic material from atmospheric-borne sources, as well as the escape of pyroreaction products generated at activation. The preferred ceramic insulator has an axial bore for receiving the portion of the electrode to be held and can be secured about the electrode by way of an adhesive material being disposed within the axial bore so as to fill and seal any clearance voids between the axial bore of the insulator and the electrode. Alternatively, the electrode insulator may be sized such that, upon cooling after being heated to an elevated temperature, the insulator directly adheres to the portion of the electrode to be sealed. The electrode, upon being secured within the initiation cavity, is then suitable for connection to a triggering circuit or an electrical arm/fire circuit, either by coaxial cable connectors, conductive leads, or other suitable connection methods.

The initiator body is preferably provided with an output charge cavity that is sized and configured to contain a suitable pyrotechnic material therein. The output charge cavity is preferably in direct communication with the micro initiation cavity. Both the micro initiation cavity and the output charge cavity are ultimately packed with a selected, but not necessarily the same, pyrotechnic material to a compaction or densifying pressure of preferably at least 1,000 psi. The selected pyrotechnic material may be provided with plasticizers to help maintain compaction density without latent expansion and crumbling after densifying pressure applied at installation is removed. Furthermore, the selected pyrotechnic material or materials may have other constituents such as carbon black to modify the ignition qualities or dielectric characteristics as desired.

Optional spacers may be included in both the micro initiation cavity and the output or boost charge cavity as required to adjust electrical gap dimensions or remove excess volume so as to tailor the strength of the respective charges. The output charge cavity, after having the pyrotechnic material packed within the initiator body, is hermetically sealed by a metallic disc or cup.

The fully assembled initiator is ready for installation upon or within a selected intermediate pyrotechnic device or component containing a primary charge or supply of pyrotechnic material. Thus, the initiator may be installed in a rocket or missile motor to initiate an energetic exothermic process leading to the ignition of the solid fuel contained within the motor. An initiator embodying the present invention is particularly suitable for being installed as a through-bulkhead initiator for solid propellant rocket or missile motors.

Upon the initiator being installed through or within a suitable pyrotechnic device, an electrical circuit is provided which will generate, on command, a pulse of electrically based energy of a sufficiently high magnitude that initiation of the pyrotechnic material in the micro initiation cavity will occur due to a small but sufficient current flowing as the result of high electric field stress induced between the exposed portion of the electrode and the inner surface of the preferably cylindrically shaped micro initiation cavity. Upon initiation of the ignition of the pyrotechnic material packed within the micro initiation cavity, the pyrotechnic material within the output charge cavity is subsequently ignited followed by the main charge of pyrotechnic material or, alternatively, the next charge of a pyrotechnic train to be functioned by the initiator.

The present invention thus provides a relatively simple, rugged, compact, light weight, and reliable apparatus and method of initiating the ignition of a pyrotechnic material which may be easily tailored to operate only upon being subjected to a fire command or voltage of at least 500 volts while also providing an ignition system which is nearly impervious to stray or spurious electromagnetic interference. These and other benefits and characteristics of the present invention will be more thoroughly described hereafter with reference to the drawings included herein.

BRIEF DESCRIPTION OF THE DRAWINGS

FIG. 1A is a simplified cross-sectional illustration of a representative rocket or missile motor in which an initiator embodying the present invention has been installed in the bulkhead of a motor so as to serve as a through-bulkhead initiator of the motor;

FIG. 1B is a simplified cross-sectional illustration of a representative detonative or explosive device in which an initiator embodying the present invention has been installed to serve as an initiator of a primary charge disposed within the device;

DETAILED DESCRIPTION

Figure 2A:
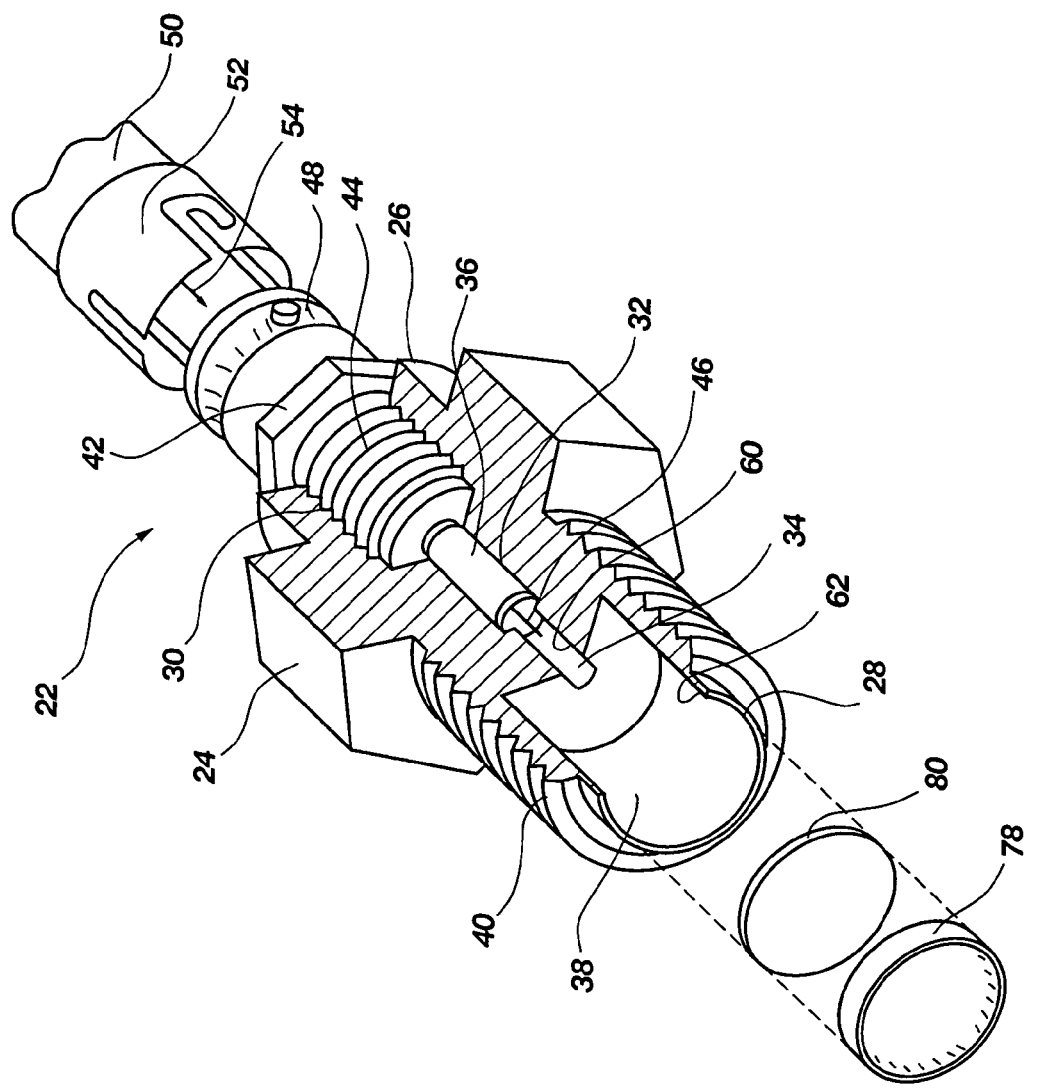
FIG. 2A is an enlarged, partially sectioned, perspective view of an exemplary initiator including an initiator body having an electrically resistive electrode positioned within and protruding from a preferably cylindrically shaped insulator.

An initiator embodying the present invention is particularly suitable for use in, but by no means limited to, initiating the ignition of a solid propellant rocket or missile motor. However, due to the present invention being particularly suitable for use as an initiator of a missile or rocket motor, the present invention will be described primarily as being used in such a context.

FIG. 1A provides a simplified schematic representation of a rocket motor 10 used to power a rocket or missile 100 shown in phantom. Rocket motor 10 includes a casing 12 encompassing a combustion chamber 14. The internal surface of combustion chamber 14 often will include a solid propellant 16 disposed thereon, which solid propellant 16 serves as the fuel that will be combusted and discharged outwardly of a nozzle, such as divergent nozzle 18. Solid propellant 16 may be of a variety of pyrotechnic materials, however, propellants comprising boron mixed with potassium nitrate ($BKNO_3$) are widely utilized for having the very favorable characteristic of being stable and nonsensitive. Other solid propellants such as nitrocellulose (NC) and zirconium potassium perchlorate (Zr/$KClO_4$) are among but a few of many known solid propellants. In many applications, a plasticizer, such as one of the Laminac plastic resins available from American Cynamid Co., is mixed with the pyrotechnic material. By adding a small volume of plasticizer to the pyrotechnic material, the pyrotechnic material will exhibit improved self-binding or cohesiveness thereby rendering a more reliable and predictable burn profile.

Most solid-propellant rocket motors, such as rocket motor 10, will typically include a dome structure including a foremost structure or bulkhead 20, which will accommodate an ignition system such as initiator 22. Thus, initiator 22 may be regarded as being a through-bulkhead initiator when it is mounted so as to extend through a selected portion of the bulkhead such that it is in direct or indirect communication with the main charge of pyrotechnic material or solid propellant 16. It should be understood and appreciated that initiator 22 may be positioned in a variety of locations other than the exemplary position shown. Furthermore, it should also be understood and appreciated that initiator 22 may be installed in devices other than in solid-propellant rocket or missile motors including, but not limited to, other types of rocket or missile motors, various pyrotechnic testing apparatus, and pyrotechnic devices used in construction, demolition, and mining applications to name only a few representative, potentially suitable applications in which the present invention may be used.

FIG. 1B has been included to illustrate that initiator 22 may also be used in connection with a detonative or explosive device 110 including a charge of pyrotechnic material 16'. Initiator 22 is installed in a suitable manner so as to expose at least the output end of initiator 22 to pyrotechnic material 16' so as to enable initiator 22 to initiate the ignition thereof. Thus, the present invention may be readily adapted to provide apparatus and methods for triggering the ignition of detonative devices used in, for example, mining, construction, and demolition applications.

Figure 2B:
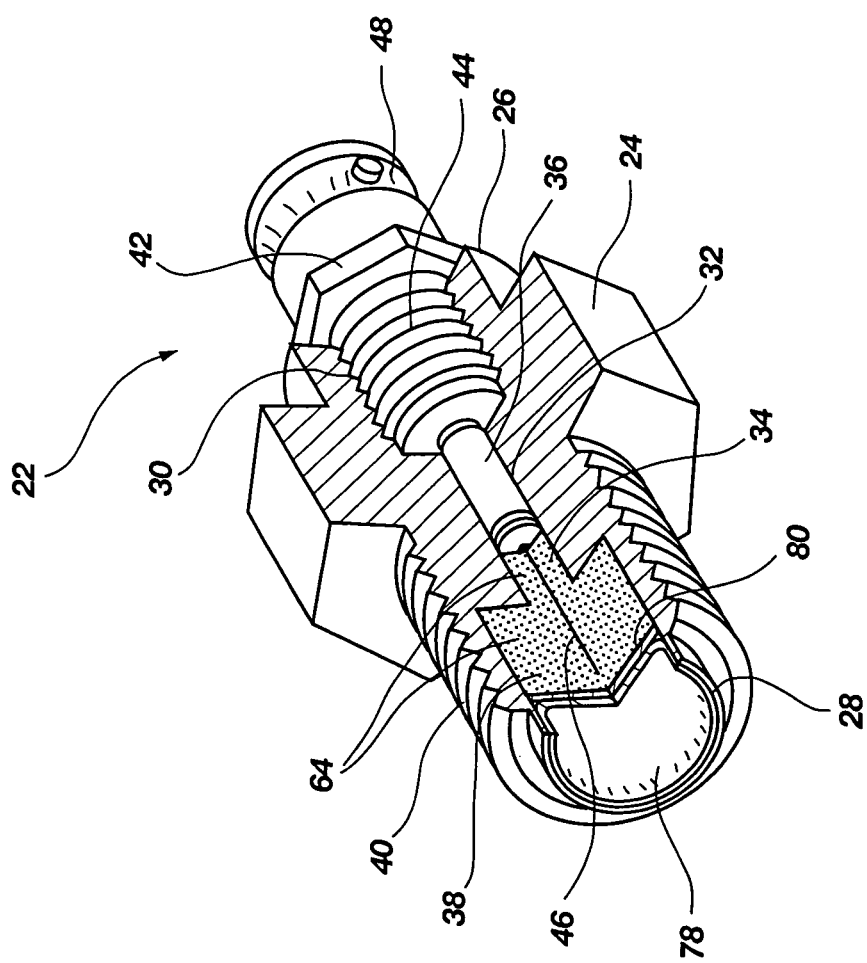
FIG. 2B is an enlarged, partially sectioned, perspective view of the exemplary initiator of FIG. 2A showing a pyrotechnic material packed therein and including an optional output charge cavity spacer and a hermetic closure in place.

FIGS. 2A and 2B provide enlarged, partially sectioned, perspective views of exemplary initiator 22. Initiator 22 preferably includes an initiator body 24 made of a material suitable for withstanding the rigors to which it will be subjected upon the initiator being triggered. Stainless steel, such as one of the AISI 300 stainless steel series, is particularly suitable for constructing initiator body 24. If initiator 22 is expected to be exposed to extreme environments, other stainless steels, stainless irons, or stainless alloys may be more suitable from which to construct initiator body 24. For example, initiator 22 and/or initiator body 24 may be constructed from one of the AISI 17-PH stainless steel series which would provide a precipitation-hardened alloy that would be especially suitable for extreme environments.

Initiator body 24 of initiator 22 further includes a connector end 26 and an output end 28. Connector end 26 is preferably configured to accommodate an electrode connector such as electrode connecter 42. Electrode connector 42 preferably includes a suitable cable connector terminal 48 at one end and an electrode holding portion 44 at an opposite end. Electrode holding portion 44 may be threaded or otherwise configured so as to be securely accommodated by connector end 26 of initiator body 24. A threaded bore or cavity 30 provides a suitable configuration for adequately sealing and securing electrode holding portion 44 of electrode holder 42. Connector end 26 of initiator body 24 and electrode holding portion 44 of electrode connector 42 need not be formed as a male/female threaded connection arrangement but may include any other connective arrangement in which an electrode may satisfactorily be electrically connected and also be adequately secured within initiator body 24. Electrode connector 42 further provides a hermetic/fluid seal between electrode holding portion 44 and initiator body 24. Furthermore, electrode holding portion 44 could be integral with initiator body 24 if desired and need not consist of a separate threaded electrode holding portion 44 and complementary threaded bore 30 for receiving at least a portion of an electrode connector 42 as illustrated.

Electrode connector 42 is preferably configured to accommodate a ceramic insulator 36. Ceramic insulator 36 is preferably made of zirconia ceramic material but may also be made of alumina ceramic material or any other material having suitable thermally and electrically insulative properties for the particular application in which pyrotechnic material is to be ultimately ignited. Ceramic insulator 36 is disposed within an appropriately sized and configured bore 32 that is preferably provided within initiator body 24 and axially aligned therewith. Electrode 46 is positioned within ceramic insulator 36 so as be partially exposed beyond an end thereof by a selected amount. That is, electrode 46 preferably protrudes from ceramic insulator 36 by a preselected amount 1 (denoted in FIGS. 5A and 5B) so as to project within micro initiation bore or cavity 34 by an amount which would be sufficient for initiating the ignition of pyrotechnic material that is to be ultimately provided within micro initiation bore 34. Furthermore, micro initiation bore or cavity 34 is sized so as to be large enough that the exposed portion of electrode 46 will not physically touch, or be grounded against, or otherwise be so close to allow electrical arcing with interior wall 60 upon electrode 46 ultimately being subject to an electrical potential as will be described herein.

Micro initiation bore 34 is in communication with a substantially larger bore 38, which is also referred to as an output charge cavity 38. Output charge cavity 38 is preferably configured in the shape of a cylinder and is of a size so as to exhibit an appropriate internal diameter or dimension to accommodate an output charge of pyrotechnic material to ensure the primary fuel or main pyrotechnic charge is properly ignited. External threads 40 provide a convenient arrangement or configuration in which to secure initiator 22 to an apparatus or device containing a main or primary charge or store of pyrotechnic material, such as a material selected for use as a solid propellant in a missile or rocket motor for example.

Cable connector terminal 48 of electrode connector 42 is preferably constructed to fittingly accommodate conventional coaxial cable connectors such as female coaxial cable connector terminal 52. A variety of suitable cooperating connector elements such as female connector terminal 52 and male cable connector terminal 48 are well known in the art and are readily available from a number of industrial suppliers. In the particular embodiment of the present invention as illustrated in FIG. 2A, coaxial connector terminal 52 includes a center conductor 54 extending from coaxial cable 50 which, when properly connected to cable connector terminal 48, is placed in electrical communication with electrode 46. At least one other conductor of cable 50, which is typically a braided conductor that extends axially and peripherally about cable 50, is placed in electrical communication with the outer surface of electrode connector 42. SMA fiber optic connectors may be readily adapted for use in connection with the present invention, with SMA connectors being especially suitable for use. The outer surface of electrode connector 42 is preferably placed in electrical contact with threaded electrode holding portion 44 which, in turn, is in electrical contact with initiator body 24. The locked, slip-fit arrangement of female coaxial cable connector terminal 52 and male cable connector terminal 48 may be reversed, if desired. However, whether terminals 52 and 48 are reversed or not, it is usually preferred to have the ground be connected to the outer, more exposed peripheral portions of terminals 52 and 48 and the central, internal conductor 54 and the centrally located internal conductor of terminal 48 be connected to the "hot" or non-grounded side of an ARM/FIRE circuit. Furthermore, another terminal arrangement that makes use of threaded terminals or any other terminal arrangement may be selected based upon the selected terminal arrangement being able to comply with applicable design criteria. Moreover, electrical connections may be established between electrode 46 and a given arm/fire circuit by way of hard wiring, solder connections, jumper connections, interference fit connections, or interlocking connections as would be known to those engaged in the art of interfacing initiators and ignition systems with electrical circuits. Thus, the exemplary arrangement of FIG. 2A utilizing a coaxial cable for ultimately electrically interfacing initiator 22 with suitable arm/fire circuit is merely one of many possible ways to achieve such an interface and any suitable arrangement may be utilized in practicing the present invention.

In the preferred configuration of coaxial cable interconnection, the ground is inherently present between the safe/arm device and the initiator. The ground is the conductor known as the shield, which is connected to the conductive envelopes of the safe/arm and the initiator. Historically, this classic coaxial connection was not employed because an IR induced voltage in the shield due to circulating ground currents produced a differentially generated voltage with current delivering ability from the center conductor. Although the voltage was seldom greater than several volts, the current available was generally more than enough to cause bridge wire type initiators to function unexpectedly. In our particular case, the guaranteed no function voltage is above 500 volts or greater. Therefore, there is now an acceptable safety margin, making classic coaxial connection acceptable.

Also shown in FIG. 2A is an output charge volume spacer 80 prior to being installed in output charge cavity 38 after a preselected amount of pyrotechnic material has been packed therein. A plurality of such spacers 80 may be used if desired, with mica being a particularly suitable material in which to construct such spacers 80. Closure discs or closure cups 78 are designed to be welded or otherwise attached to output end 28 over one or more spacers 80, as required, to hermetically seal output end 28 so as to maintain the packing density of the pyrotechnic material packed therein. Closure cups 78 may be constructed of stainless steel such as AISI 304 and serve to maintain pyrotechnic packing density as well as to hermetically seal at least the output charge volume from the environment. Closure cup 78 may be a flat disc or a cup-shaped disc that is welded on or otherwise secured about output end 28. Closure cup 78 may be stamped, coined, etched, or machined to provide controlled rupture geometry (pedaling, hinging, splitting, etc.) at the time the output charge is ignited to ensure peripheral detainment of the closure residue.

Electrode 46 is preferably constructed of a nickel-chromium based stainless steel wire or other wire having a high resistance to corrosion. Such corrosion resistance is especially needed when considering that electrode 46 may be placed within a micro initiation cavity containing a nitrate based material, which can chemically attack the electrode and potentially cause extensive damage to the electrode were the initiator to be stored for a number of years. Thus, electrode 46 is preferably made of a stainless steel such as chromel-P thermocouple wire or any other suitable steel or alloy preferably having suitable corrosion resistance properties. As will be described in detail herein, not only are the electrode material properties significant, but the length of the electrode 46 that is to be exposed within initiator bore 34 is critical and must also be carefully selected.

Micro initiation bore 34, in which electrode 46 is preferably axially centered, is in communication with output charge cavity or volume 38 which preferably exhibits an interior wall 62 that defines a substantially larger inside diameter as compared with the inside diameter defined by the interior wall 60 of micro initiation bore 34. Ultimately, both output charge cavity 38 and micro initiation bore 34 will be packed with a pyrotechnic material, such as $BKNO_3$ for example, that will be progressively ignited upon electrode 46 being sufficiently energized. Output charge cavity or volume 38 is positioned so as to be in communication with the main charge of pyrotechnic material that is to be ignited. In the case of using initiator 22 of the present invention as a component of a rocket motor ignition system, output charge cavity 38 would be positioned within the rocket motor so as to be in direct communication with the primary charge of solid-propellant fuel which will be burned to propel the rocket or missile. If the initiator 22 of the present invention is used in other applications, output charge cavity 38 would be positioned either in direct communication with the primary charge of pyrotechnic material or, alternatively, be placed in direct communication with the next charge to be ignited in a pyrotechnic train. Thus, in the case of initiator 22 being used to ignite the main charge of solid propellant in a rocket motor, initiator 22 could be installed in bulkhead 20 of rocket motor 10 by way of optional threaded portion 40 as schematically illustrated in FIG. 1A. That is, threaded portion 40 would be installed either directly into a complementary threaded bore provided in bulkhead 20 or into a complementary fitting installed in bulkhead 20 so as to allow output charge cavity or volume 38 to be in communication with solid propellant fuel 16. Alternatively, a variety of other methods of suitably securing initiator 22 in a bulkhead 20 or other components of a rocket motor that would provide a robust, hermetic seal between the initiator and the bulkhead, casing, or other component of a rocket motor exhibiting a sufficient amount of temperature and pressure resistance may be used as known in the art. Likewise, a variety of suitable methods of securing an initiator embodying the present invention in non-rocket motor applications may be used as known in the art.

Figure 3:
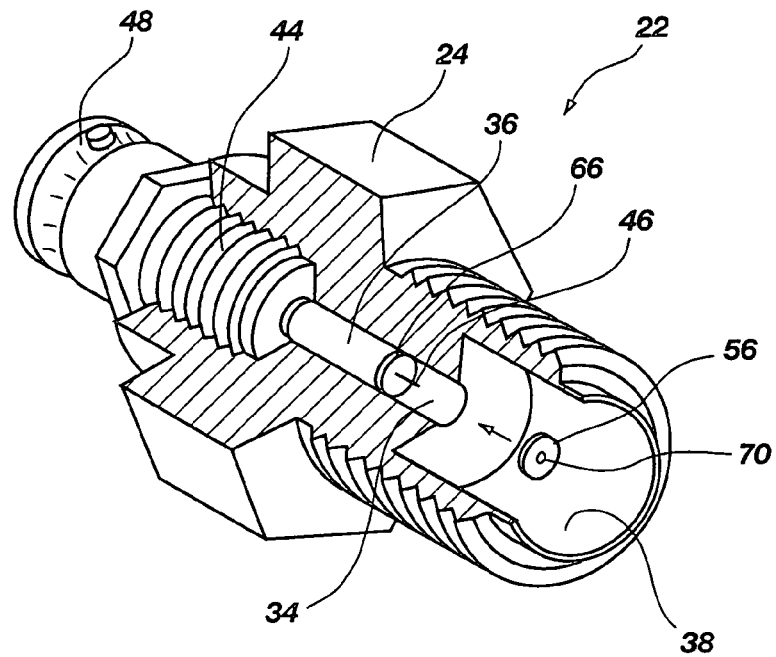
FIG. 3 is a partially sectioned, perspective view of the previously illustrated initiator depicting the disposition of an optional mica disc therein.
Figure 4:
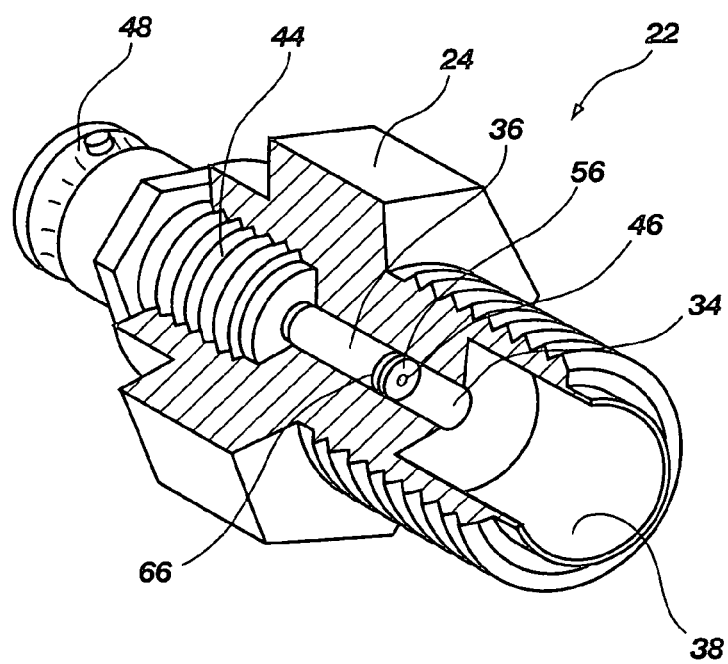
FIG. 4 is a partially sectioned, perspective view of the previously illustrated initiator depicting the optional mica disc having been disposed therein.

FIGS. 3 and 4 illustrate how, in accordance with the present invention, an initiator embodying the present invention may optionally be optimized to provide a very precise initiation of the ignition of a selected pyrotechnic material. FIG. 3 depicts initiator 22 as previously described and illustrated while also depicting a mica disc 56 having an axial bore 70 being inserted through output charge cavity 38 to be ultimately positioned within micro initiation bore 34 as shown in FIG. 4. Mica disc 56 is positioned so as to axially reside against ceramic insulator 36 with electrode 46 extending through hole 70. Hole 70 is sized diametrically to not only allow electrode 46 to pass therethrough, but is also sized to allow a gap or void between the outer surface of electrode 46 and the interior surface defining hole 70 so as to allow a preselected amount of pyrotechnic material to be packed therein. Thus, the diameter of hole 70 may be selectively sized so as to tailor exactly how much volume of pyrotechnic material will ultimately be packed immediately proximate electrode 46. Therefore, mica disc 56 is a particularly suitable space filler for applications where micro initiation bore 34 may be larger than what would be ideal with respect to the quantity of pyrotechnic material that would otherwise be accommodated in the void between electrode 46 and interior surface 60 of micro initiation bore 34. Such a scenario, wherein too much pyrotechnic material was packed immediately proximate electrode 46, could result in a too high of a caloric output or result in a less than ideal ignition profile. Therefore, mica discs 56, or other suitable spacers, whether metallic or non-metallic, may optionally be used to optimize the initiation characteristics of the ignition of the charge immediately surrounding electrode 46. Mica is particularly suitable due to its electrical and thermal transfer properties being complementary to many pyrotechnic materials. The thickness of mica discs 56 may be varied in proportion to how much space between electrode 46 and interior surface 60 of micro initiation bore 34 needs to be filled. Alternatively, a plurality of mica discs 56 may be axially stacked to adequately fill the desired amount of space between electrode 46 and interior surface 60 of micro initiation bore 34.

Figure 6A:
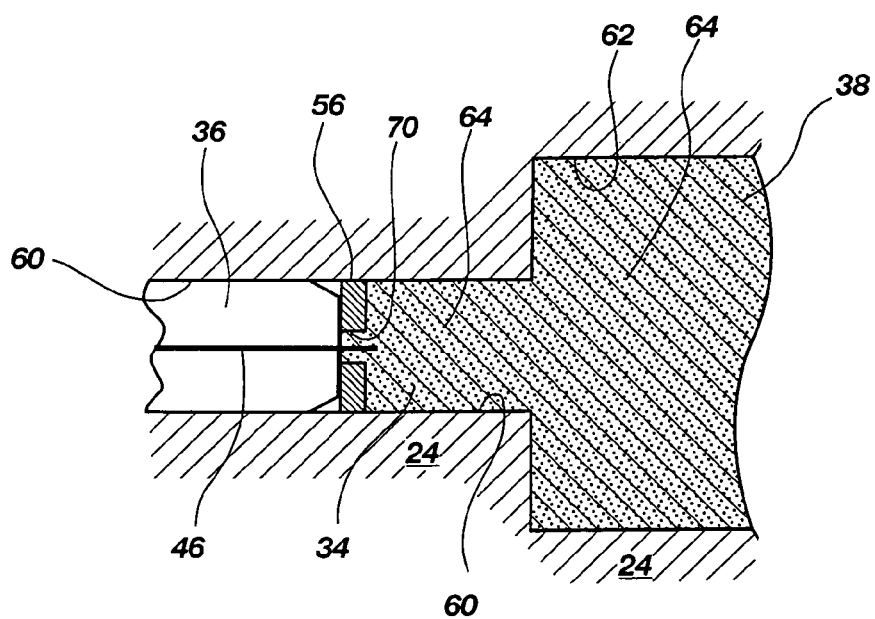
FIG. 6A is an isolated cross-sectional view of the previously illustrated initiator depicting a pyrotechnic material having been packed within the micro initiation cavity and the output charge cavity.
Figure 6B:
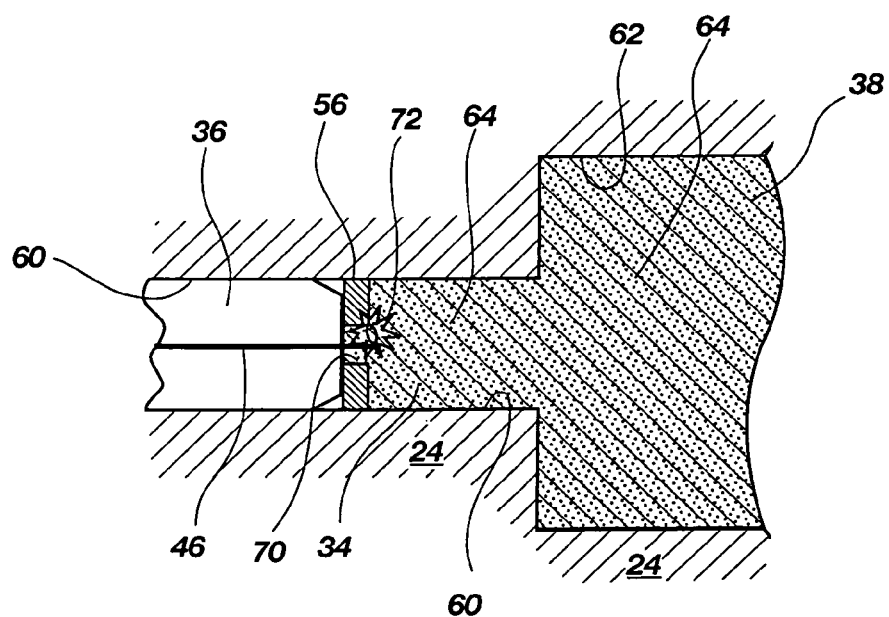
FIG. 6B is an isolated cross-sectional view of the previously illustrated initiator depicting the initial ignition of the pyrotechnic material.

FIGS. 6A and 6B provide cross-sectional, isolated views of initiation bore 34 of previously described and illustrated initiator 22. FIGS. 6A and 6B further depict micro initiation bore 34 and output charge cavity 38 being packed with a pyrotechnic material 64 such as B/KNO$_3$. A typical packing pressure for B/KNO$_3$ is approximately 1,500 pounds per square inch (1.5 Kpsi) with a range of approximately 1,000 psi to approximately 2,000 psi being suitable for a wide variety of applications. However, packing pressures below 1,200 psi may potentially cause erratic time delays and variability in caloric output due to variation in densification. If desired, a pyrotechnic material may be disposed in micro initiation bore 34 which differs from a pyrotechnic material disposed in output charge cavity or boost charge volume, so as to make, for example, a detonator type initiator. The total amount of B/KNO$_3$ provided in both initiation bore 34 and output charge volume 38 may range upwards of 250 milligrams (250 mg) and greater. However, a total charge of such material in excess of about 250 mg may become very hazardous and should be avoided unless design criteria demands otherwise. A total charge of 60-70 mg of B/KNO$_3$ will work for a wide variety of applications, including applications that incorporate the present invention in the ignition systems of rocket or missile motors.

FIG. 6A shows mica disc 56 fully installed within micro initiation bore 34. FIG. 6B shows an initial ignition 72 of the micro initiation column of pyrotechnic material contained within micro initiation bore 34, or more accurately, the pyrotechnic material surrounding electrode 46 within hole 70 of mica disc 56 upon a sufficient triggering electromotive energy or voltage being applied between electrode 46 and initiator body 24. Although not illustrated in FIG. 6B, it will be appreciated by those engaged in the art that initial ignition 72 of pyrotechnic material currently present in micro initiation bore 34 will, as a practical matter, nearly instantaneously propagate the ignition of the pyrotechnic material 64 contained in output charge volume 38 and ultimately the main or primary charge of pyrotechnic material.

Figure 5A:
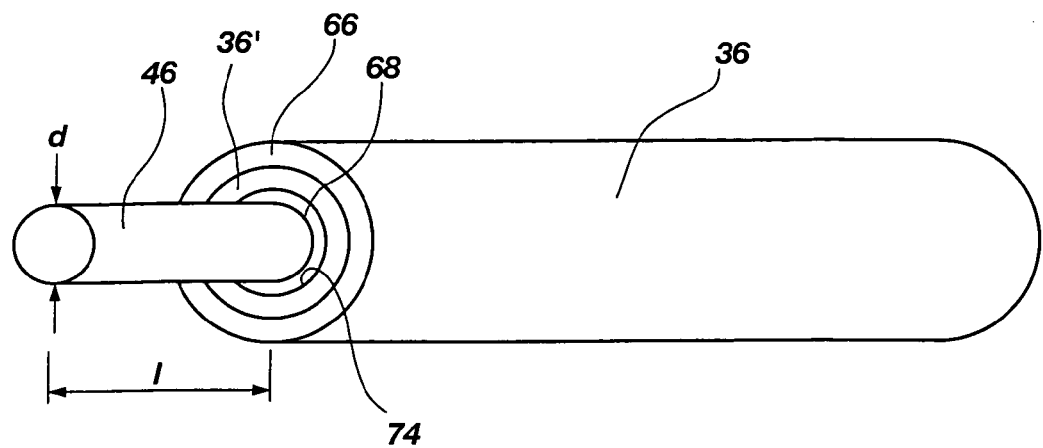
FIG. 5A is an isolated view of a ceramic insulator preferably provided within an initiator embodying the present invention wherein the electrode is optionally hermetically secured within the insulator by an adhesive.
Figure 5B:
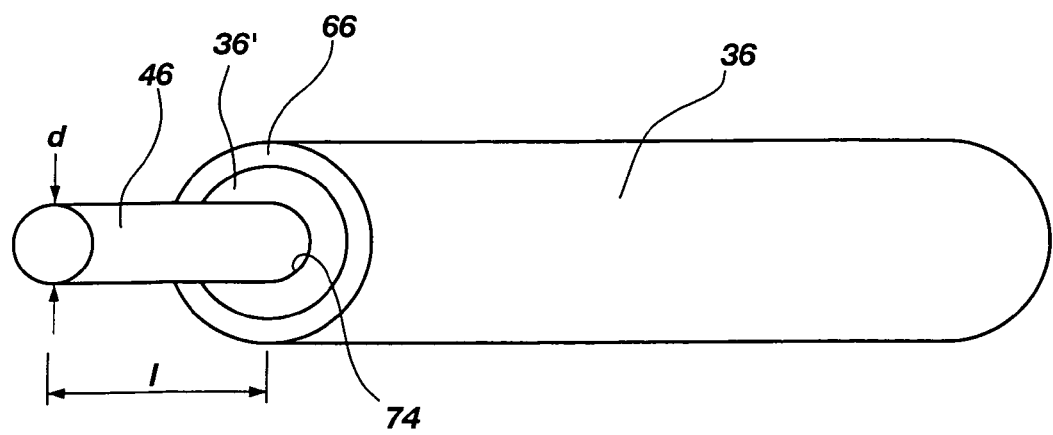
FIG. 5B is an isolated view of a ceramic insulator preferably provided within an initiator embodying the present invention wherein the electrode is optionally hermetically secured within the insulator without the use of an adhesive.

FIGS. 5A and 5B are isolated, enlarged, perspective views of ceramic insulator 36 and electrode 46 which respectively show alternative arrangements in which electrode 46 may be sealingly secured about its periphery by ceramic insulator 36. FIG. 5A depicts ceramic insulator 36 encompassing all but a selected length of electrode 46. Electrode 46 is of a selected diameter d and protrudes outwardly from insulator 36 by a preselected amount 1. The end of ceramic insulator 36 which is viewable in FIG. 5A is provided with an optional chamfer or bevel 66 to aid in the insertion of ceramic insulator 36 into axial bore 32 of initiator body 24 (not shown in FIGS. 5A and 5B). The portion of the viewable end of ceramic insulator 36, which is not chamfered or beveled, is identified as end surface 36'. Such end surface 36' may be regarded as being optional as chamfer portion 66 may extend across the entire end of ceramic insulator 36. Conversely, no bevel portion 66 need be provided and end surface 36' may extend across the entire end of ceramic insulator 36. The most significant aspect of the ceramic insulator/electrode arrangement shown in FIG. 5A is that an adhesive 68 is disposed between the outer periphery of electrode 46 and the inner surface of bore 74, which extends axially through ceramic insulator 36. That is, bore 74 is of an internal diameter which is larger than the outer diameter d of electrode 46. Thus, an adhesive, for example, such as Emerson and Cumming STYCAST 2651-40 adhesive manufactured by W.R. Grace & Co, Canton, Mass. (which coincidently meets MIL-I-16923 for types B, C, and D) is disposed within the space or void resulting from the relatively smaller diameter of electrode 46 and the relatively larger inside diameter of bore 74 of ceramic insulator 36. Other adhesives exhibiting suitable dielectric characteristics, thermal and pressure resistance, and hermetic sealing characteristics may be used.

As an alternative to using a selected adhesive 68 as illustrated in FIG. 5A, the electrode/ceramic insulator arrangement illustrated in FIG. 5B does not require such a preselected adhesive as bore 74 within ceramic insulator 36. In the arrangement of FIG. 5B, an unfired ceramic insulator 36 is provided with a bore 74 that is sized so that upon an electrode 46 being positioned within bore 74 and upon both electrode 46 and ceramic insulator 36 being fired or heated, causes bore 74 to hermetically seal about electrode 46. Such a firing occurs as ceramic insulator 36 is heated to a temperature sufficiently high that causes a "green" ceramic insulator 36 to swell and then shrink and harden upon controlled cooling, thereby securing itself about electrode 46 to render a nonadhesive, hermetic seal having desired dielectric, temperature, and pressure-resistant characteristics. Such a ceramic insulator that is fired upon an electrode dispenses with the use of an adhesive, which may be beneficial in certain environmental conditions or applications. Both arrangements offer different advantages in that when an adhesive is used, electrodes having different diameters need not be provided with a ceramic insulator having a specific bore of a specific diameter that will properly secure itself about an electrode upon being fired. As an alternative to forming insulator 36 from a ceramic material, a glass-based frit material suitable for effective pressure sealing at an elevated temperature and pressure could be used. Furthermore, when using an adhesive style electrode/ceramic insulator arrangement, inadvertently subjecting the electrode to excessive firing temperatures is eliminated as adhesive may be cured at room temperature or at temperatures that are far less than temperatures required to fire a ceramic material.

The operation and various beneficial attributes of an initiator embodying the present invention will now be described. Prior to the present invention, dielectric breakdown ignition (DBI) of stable pyrotechnic material, such as for example pure B/KNO$_3$ or B/KNO$_3$, having a small amount by volume of plasticizers included therein, was severely thwarted by the need for very high voltages to be available to properly initiate the ignition of the pyrotechnic material. A representative graphical depiction of voltage vs. time of ignition of a dielectric breakdown ignition of a stable pyrotechnic material is provided in FIG. 7. Such high voltages needed were of the magnitude of 10 KV and greater. Therefore, prior to the initiator disclosed herein, it was not feasible to provide a low cost, stored energy actuated pyrotechnic initiator that contains only B/KNO$_3$ or B/KNO$_3$ having a small amount by volume of plasticizing binders included therein. That is, in certain applications, it was not previously feasible to provide an initiator that could withstand being subjected to 500V without an output event and, therefore, conform to MIL-STD-1901 pertaining to safety criteria for missile and rocket motor ignition systems.

Figure 7:
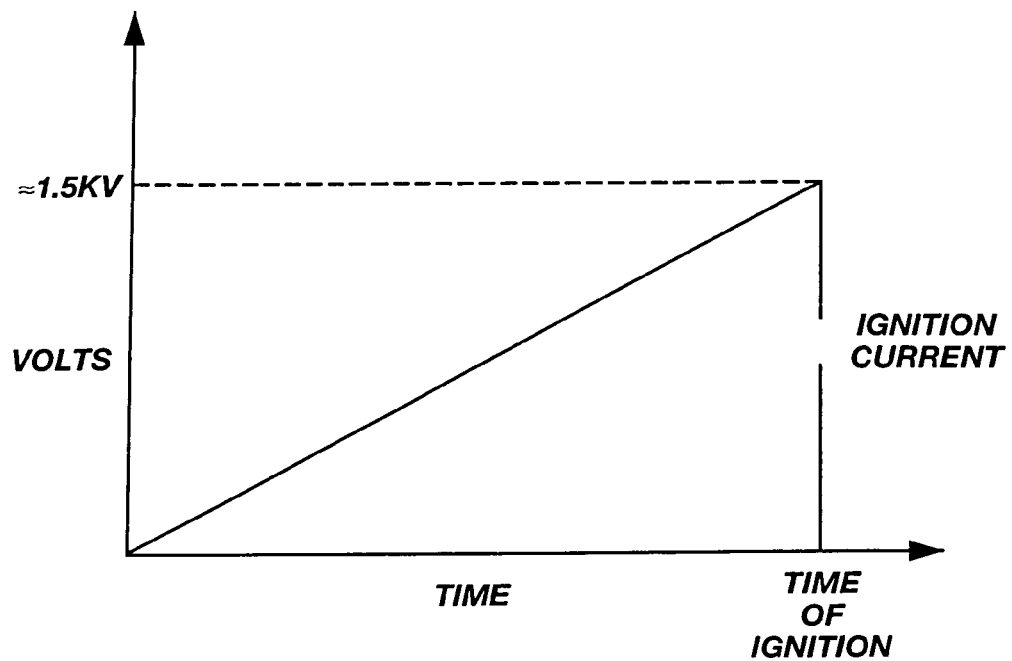
FIG. 7 is a graphical representation of voltage vs. time of ignition as the present invention initiates the ignition of a suitable pyrotechnic material by way of the pyrotechnic material breaking down in a linear manner.

Stated differently, in order to comply with MIL-STD-1901, an acceptable intrinsically high voltage stored energy initiator using powered boron and potassium nitrate (B/KNO$_3$) mixed together as the stored energy medium, the initiator must be capable of magnifying the electrically derived thermal energy triggering the initiation event, yet produce a repeatable low millisecond delay and caloric output strength while mandatorily providing an input trigger connection able to withstand 500V indefinitely so as to dispense with otherwise mandatory mechanical interfacing protection, at least with respect to missile and rocket motor applications. Thus, an initiator embodying the present invention is purposely constructed on a scale which allows for the dielectric breakdown ignition and which is depicted in FIG. 7. As graphically illustrated in FIG. 7, the DBI is characterized by a linear relationship with respect to there being sufficient current associated with the voltage over time to activate the initiation process but no conditioning or activation occurs prior to such threshold current being achieved and a desirable current avalanche profile occurring. For most cases, it is preferred that the initiator be designed to react to a threshold current in which dielectric breakdown ignition of the pyrotechnic material occurs at approximately 1,500 volts (1.5 KV). However, a particularly useful and acceptable triggering voltage range is from about 500 volts to about 2,000 volts (0.5 KV to 2 KV) with it being possible to provide a triggering voltage exceeding approximately 4,000 volts (4 KV). Because an initiator embodying the present invention may take advantage of the DBI mechanism, the ability for such an initiator to be optimized with respect to speed and caloric output allows for reduced dynamic range requirements of the triggering mechanism and further allows for a simpler, smaller, and likely a more reliable firing circuit to be used in connection therewith.

Figure 8:
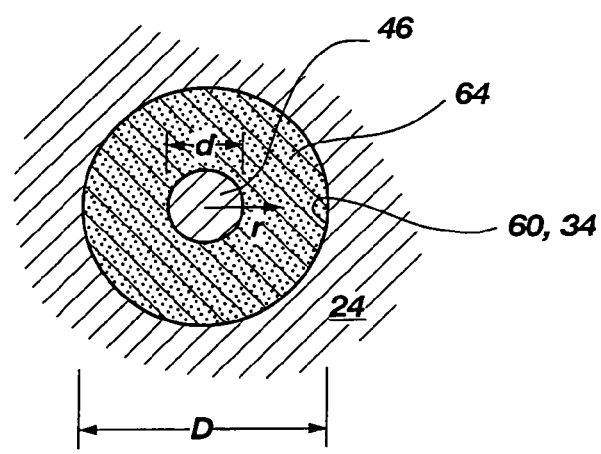
FIG. 8 is a schematic view of a coaxial electrical transmission line conductor for delivering the electric energy to create the intense field strength to function as the initiator embodying the present invention.

As illustrated in a number of the previously referenced drawings, the preferred geometry at the point where the initial ignition of the pyrotechnic material occurs, i.e., between the electrode and the pyrotechnic material packed within the micro initiation bore, is generally cylindrically configured. The generally cylindrical configuration is believed to offer the best electrical current gradient in terms of providing a requisite amount of energy per unit of radial distance from the outer surface of the electrode. Thus, the ignition of a pyrotechnic material, such as, but not limited to, B/KNO$_3$ or NC, in an initiator embodying the present invention may be analyzed by applying classical coaxial electrical conductor physics in order to determine the optimum size and shape that a micro initiation bore and/or output cavity is to have. FIG. 8 of the drawings is a schematical representation of the electric field generated by electrode 46 upon a sufficient amount of voltage being applied between electrode 46 and initiator body 24 and thus through pyrotechnic material 64 disposed within micro initiator bore 34. The strength of the electric field at the surface of electrode 46 as a function of distance in mils may be mathematically stated wherein:

$$\frac{\Delta e}{\Delta r} \frac{\text{volts}}{\text{(mil)}} = \frac{.434 E}{r \log_{10}(D/d)}$$

D is the inside diameter of micro initiation bore 34 in mils (thousandths of an inch);
d is the outside diameter of electrode 46 in mils;
E is the total voltage between electrode 46 and interior wall 60 of micro initiation bore 34; and
r is the radius in mils to the point of analysis.

It should be noted that by adjusting the D/d parameter, the electric field gradient at the surface of electrode 46 (minimum r) may be tailored to produce an extremely high amount of volts per mil at the surface of electrode 46 in which pyrotechnic material such as B/KNO$_3$ is packed tightly thereagainst. In terms of energy, the electric field gradient may be adjusted or tuned to provide between 15 mJ to approximately 1,000 mJ and 500V of energy per mil at 500 to 4,000V.

As an example of the high voltages obtainable with an initiator embodying the present invention, an initiator configured as exemplarily illustrated in the drawings was designed with the following characteristics:
  i. E was equal to 500V;
  ii. d of electrode 46 was 5 mils (0.005 inch);
  iii. D of micro initiation bore 34 was 40 mils (0.040 inch);
  iv. r was analyzed at the surface of electrode 46 so r equals d of 5 mils divided by 2 or 2.5 mils (0.0025 inches);
  v. l or length of the exposed portion of electrode 46 was approximately 40 mils; and
  vi. the total amount of B/KNO$_3$ packed to approximately 1,500 psi in both the micro initiation bore and the output charge cavity was approximately 250 milligrams (250 mg) with approximately 70 mg in the micro initiation bore and approximately 180 mg in the output charge cavity.

Upon inserting the above values in the above equation, the calculated voltage per mil at the surface of electrode 46 was in excess of 48,000 volts (48 KVs).

Although this amount of voltage per mil is clearly beyond the tolerance of most, if not all, dielectrics, it should now be appreciated that an initiator constructed to take advantage of the benefits offered by a coaxial electrode/micro initiation bore arrangement in accordance with the present invention, can readily generate at the relatively low input voltage of only 500V an electric field that will initiate the ignition of very stable pyrotechnic materials including, but not limited to, B/KNO$_3$ with or without a plasticizer such as Laminac resin mixed therein. Furthermore, pyrotechnic material such as nitrocellulose (NC) or other known pyrotechnic materials may be used in lieu of or in combination with B/KNO$_3$ when practicing the present invention.

The intrinsic electrical breakdown of the pyrotechnic material 64 within micro initiation bore 34 may be characterized by a sequence of typically very rapid processes leading to a change from the pyrotechnic material serving as a dielectric or electrical insulator to being an electrical conductor. That is, the first or initiating stage may be described as a stage of increasing conductivity leading to a second stage of instability with current runaway. The third stage may be referred to as one of voltage collapse, which is dependent upon voltage source impedance. The fourth stage may be referred to as a settling down stage where heat is generated by ohmic conduction in essentially an equilibrium state. The last or fifth stage may be described as the ignition stage with ignition occurring due to there being sufficient current-voltage induced heat being produced to ignite the pyrotechnic material. The time in which to reach stage 4 from initiation is generally within a magnitude of microseconds with stage 5 occurring within a few milliseconds after stage 4 is completed. Therefore, it can be appreciated that when designing an initiator that is to initiate the ignition of a pyrotechnic material with an input voltage of approximately 1,500V, an extremely high voltage/mil (theoretically exceeding 288 KV/mil) may be generated at the outer surface of the electrode with an initiator having an electrode/initiation bore arrangement configured and sized with the remaining above exemplary values. It should now be appreciated that the distance in which the outer surface of electrode 46 is distanced from interior wall 60 of micro initiation bore 34 will directly influence how much input voltage is needed to trigger the initiation sequence of the pyrotechnic material packed therein. That is, if it is desired that a high input voltage be required to trigger the ignition of the pyrotechnic material, the distance between the outer surface of the electrode and the interior wall may be increased. If a relatively less or lower amount of input energy is desired, the electrode surface and the interior wall may be positioned to be in closer proximity to each other. Additionally, diameter d of electrode 46 may be increased to require a greater amount of input energy to be provided to trigger the ignition of the pyrotechnic material. Conversely, diameter d of electrode 46 may be decreased to require a lesser amount of input energy to be provided to trigger the ignition of the pyrotechnic material. As an alternative, metal washers having a hole extending axially therethrough may be inserted into micro initiation bore 34 to effectively reduce the radial distance between the outer surface of electrode 46 to interior wall 60 of micro initiation bore 34. However, such washers or spacers may not be prudent in some applications.

With respect to generating an input voltage of a desired magnitude, there are at least three suitable methods of generating an input voltage of a sufficient magnitude to effectively trigger the ignition of a given pyrotechnic material in accordance with the present invention. Such methods include, but are not limited to, a single pulse of input energy of a sufficient magnitude, a steady state direct current (DC) voltage source with current limiting output impedance, and direct high voltage alternative current (AC) with current limiting source impedance. The single pulse method offers the simplest, smallest, and possibly the most reliable method and is currently considered to be the best method for a large variety of applications.

Figure 9:
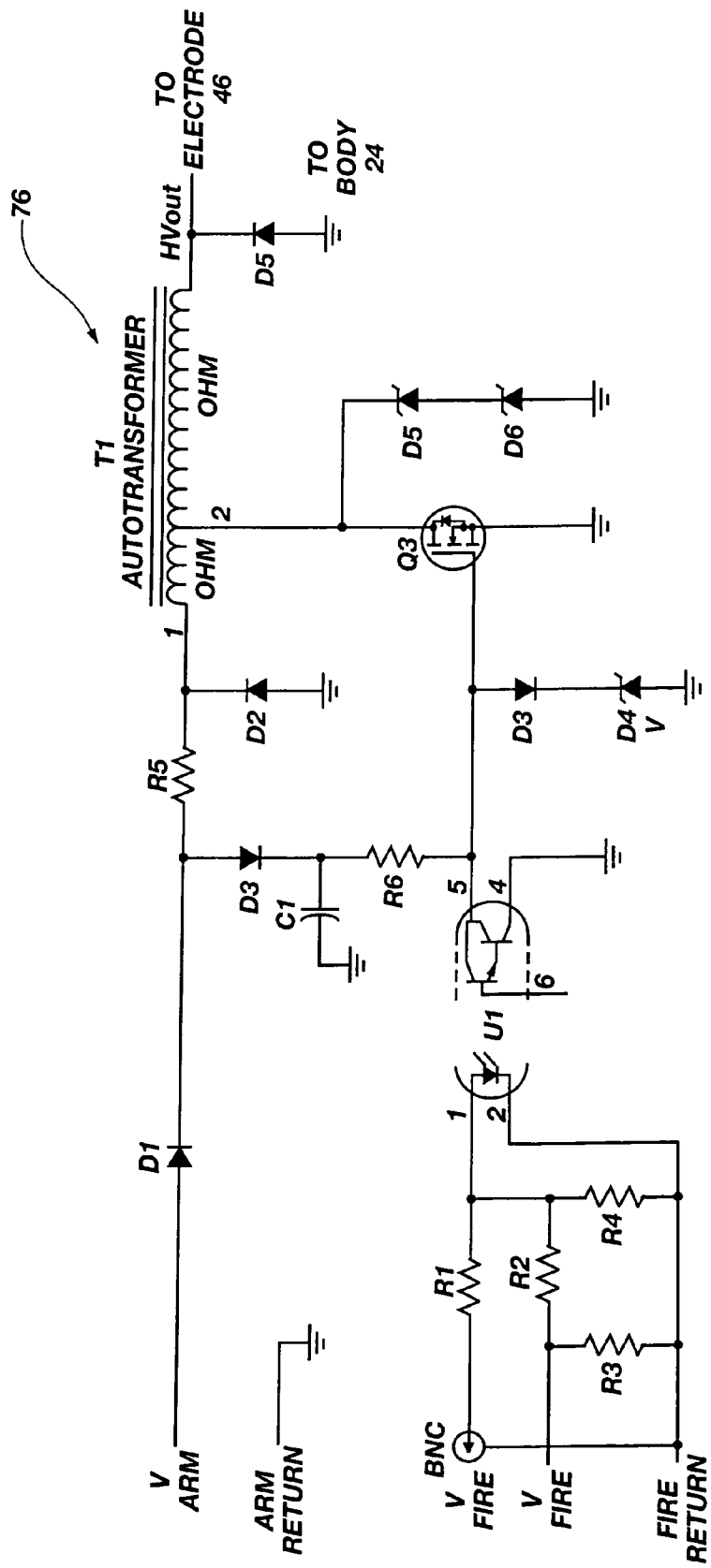
FIG. 9 is a schematic summarization of an exemplary single pulse, high voltage arm/fire circuit suitable for use in connection with the present invention.

FIG. 9 is a schematic of an arm/fire circuit 76 that is particularly suitable for, but not limited to, use in practicing the present invention in connection with providing an ignition system for solid propellant rocket or missile motors. Arm/fire circuit 76 is of the single pulse type. This particular circuit is provided with two input ports, an arm input, and a fire input.

The ARM (and ARM RETURN) input for many applications will be connected to a 28 VDC power source; however, arm/fire circuit 76 may be designed to accommodate any ARM input voltage. ARM input power is for energizing a magnetic field in the autotransformer T1 for an inductive build up of current. The diode D1 provides input polarity protection in the event input circuit connections are accidentally reversed.

The FIRE (and FIRE RETURN) input for many applications will also be connected to a 28 VDC power source; however, arm/fire circuit 76 may be designed to accommodate any FIRE input voltage. FIRE input power serves as the trigger signal that will release the energy inductively generated by the magnetic field of autotransformer T1. In general, the ARM power input must precede the FIRE power input by a certain amount of time to allow the autotransformer sufficient time to generate a sufficient amount of stored energy ($0.5 L$ times $I^2$). Such lead-time is typically less than about .05 second. Resistors R1-R4 provide input current scaling for the input diode of optical isolator U1. Optical isolator U1 reduces the likelihood of circuit 76 interacting with unknown current sneak paths as well as preventing arm/fire circuit 76 from interacting with other known circuits.

A suitably high voltage pulse of typically at least 50 mJ of energy (V times I) is capable of being delivered at the high voltage output (HVout). Isolation diode D3 prevents sudden loss of gate drive to MOSFET high voltage transistor Q3 upon removal of the ARM energy source. Capacitor C1 provides a long time constant to guarantee collapse of the energy field stored in autotransformer T1 before gate voltage to transistor Q3 may decay. Resistor R6 limits current to the gate circuit. Resistor R5 limits current through terminals 1 and 2 of autotransformer T1 as induction back voltage approaches zero. Diode D2 provides a path to ground for the primary current to collapse if the ARM power input should be removed before a normal FIRE event. Optical actuator U1 also removes gate voltage upon a FIRE input being introduced by passing current through resistor R6 to ground. Isolation diode D3 isolates the capacitance of the zener diode junction from the gate circuit during the activation of optical actuator U1. Zener diode D4 limits transistor Q3 gate voltage below breakdown values. MOSFET high voltage transistor Q3 provides a fast switch to allow sudden collapse of the magnetic field of autotransformer T1. Diodes D5 and D6 suppress transient over voltage by passing current to ground at a voltage threshold which is suitably less than the maximum allowable drain to source breakdown voltage of transistor Q3. This protection feature is useful if HV out is not connected (open circuit condition) during magnetic field collapse.

Autotransformer T1 is selected to have suitable self-inductance and turns ratio properties to store a suitable amount of energy that may be quantified in the terms of $I/2LI^2$. Autotransformer T1 will typically have an output to input voltage ratio of 10:1 or, in other words, an output voltage approximately ten times the voltage transistor Q3 is expected to be subjected to. Diode D6 is a reverse voltage rated diode that prevents a large negative voltage spike from developing at the high voltage output (HV out) during current buildup in autotransformer T1 responding to ARM power input. Bypassed auto-induction energy is generally dissipated in the internal resistance of the secondary portion of the winding of the autotransformer. High voltage output is typically connected to electrode 46 via a center conductor of coaxial cable 50 (not shown in FIG. 9) and the outer braided conductor of coaxial cable 50 typically is connected with ground and is connected to initiator body 24 so as to ensure a common ground with the ground of circuit 76.

The following is a description of the functioning sequence of exemplary arm/fire circuit 76 as incorporated in an ARM/FIRE device for triggering an initiator, such as initiator 22 for example, that is in communication with the solid propellant of a missile or rocket motor such as rocket motor 10 for example. A suitable voltage source is connected to ARM and ARM RETURN. As capacitor C1 charges above a selected voltage by way of diodes D1 and D2 and resistor R6, transistor Q3 begins to conduct current, thereby effectively grounding terminal 2 of autotransformer T1. Inductor charging current flows by way of diode D1, resistor R5, terminals 1 and 2 of autotransformer T1, transistor Q3, and back to ARM RETURN, thereby building up a magnetic field of suitable strength in autotransformer T1. Usually after several system time constants have been satisfied, current is essentially limited to its maximum value by resistor R5 and the winding resistance of autotransformer T1 for a given ARM voltage. A FIRE signal or command is applied to FIRE and FIRE RETURN. Scaling resistors R1 through R4 pass suitable current to the light emitting diode in optical actuator U1 causing the transistors connected to junctions 4 and 5 to pass current passing through R6 to ground. Although it is likely that a small voltage remains on the gate leading back to the arm voltage source connection, it will be below the cutoff voltage of transistor Q3. Upon the FIRE signal being applied, transistor Q3 abruptly stops conducting current and in accordance with Lenz's law, the voltage at junction 2 swings positive in opposition to the collapsing current through transistor Q3. As a result, high voltage approximately 10 times the switching voltage appears at the HV output terminal and is conducted via coaxial cable connector 50 to electrode 46 and initiator body 24. When the pyrotechnic material, such as B/KNO$_3$, with or without a small amount of plasticizer (such as Laminac resin) which forms the micro initiation charge column within micro initiation bore 34 of the exemplary initiator is subjected to the high voltage from the HV output terminal, the energy delivered between electrode 46 and initiator body 24, and thus being delivered to the pyrotechnic material immediately surrounding electrode 46, may be quantified in Joules as current times voltage from the high voltage output terminal. Within a very short time, the B/KNO$_3$ dielectrically breaks down as more and more energy is absorbed, causing a rapid temperature rise and ultimately the ignition of the micro initiation charge, which subsequently causes the ignition of the output boost charge, which in turn causes the solid propellant of the rocket or missile motor to ignite.

It should readily be understood that the above description is intended to be a general description of the functioning of but one exemplary arm/fire circuit, such as the single pulse circuit 76, as being used in the context of providing an ignition system for a solid propellant rocket or missile motor in accordance with the present invention. It should also be readily apparent to those of ordinary skill in the art that there are a large variety of single pulse circuits that would be perfectly suitable for generating a sufficient amount of high voltage energy which would cause the dielectric breakdown initiation of a given and suitable pyrotechnic material, even stable, nonsensitive, pyrotechnic material such as B/KNO$_3$.

The present invention may also be used to initiate the ignition of a pyrotechnic material such as B/KNO$_3$ and/or NC that includes a small amount per volume (e.g., 2%) of carbon black and/or a plasticizer such as Laminac resin. The presence of carbon black will likely require that the pyrotechnic material be ignited by way of a bulk resistance initiation (BRI) which may require very high input voltages to be generated by the arm/fire circuit to be used therewith. If the present invention is to be used to initiate a pyrotechnic material by way of BRI, it may be desirable to use an arm/fire circuit that has safeguards for preventing voltages less than that required for initiation to prevent unwanted conditioning of the pyrotechnic material that could lead to erratic initiation upon a sufficiently high voltage being applied to the initiator.

Other arm/fire circuits are suitable for use with the present invention, including an arm/fire circuit incorporating a steady state direct current (DC) voltage source with current-limiting output impedance or an arm/fire circuit incorporating a direct high voltage alternative current (AC) with current-limiting source impedance. Such alternative circuits may be readily designed by those of ordinary skill in the art upon having reviewed the foregoing description and upon referencing the appended drawings.

Thus, it is to be understood and appreciated by those skilled in the art that the present invention as defined by the following claims is not to be limited by the particular details set forth in the above-detailed description as many variations, modifications, and combinations of various features and aspects of the present invention are possible without departing from the spirit and scope of the present invention as claimed.

What is claimed is:

1. An initiator comprising:
an initiator body including a connection end and an output end, the initiator body further including a micro initiation cavity defined at least partially by an interior wall of the initiator body and being sized and configured for accommodating a column of pyrotechnic material of a selected volume, the micro initiation cavity being in communication with the output end of the initiator body;
an elongated electrode supported by an electrode insulator, at least a portion of the elongated electrode being exposed and centrally disposed within the micro initiation cavity so as not to physically contact the initiator body, wherein the column of pyrotechnic material provides a current path between the elongated electrode and wherein the elongated electrode and the initiator body are configured for connection to an electrical circuit capable of generating a voltage therebetween; and
a micro initiation column of pyrotechnic material disposed in the micro initiation cavity and surrounding the exposed the at least a portion of the elongated electrode, the micro initiation column of pyrotechnic material providing an electrical current path between the elongated electrode and the interior wall of the initiator body.

2. The initiator of claim 1, wherein the micro initiation cavity comprises a generally cylindrical configuration.

3. The initiator of claim 2, further comprising an output charge cavity adjacent the output end and intermediately positioned between the output end and the micro initiation cavity, the output charge cavity sized and configured for accommodating a boost charge of the pyrotechnic material of the selected volume and wherein the output charge cavity is in direct communication with the micro initiation cavity.

4. The initiator of claim 3, wherein the output charge cavity comprises a generally cylindrical configuration.

5. The initiator of claim 4, wherein the size of the micro initiation cavity is substantially less than the size of the output charge cavity.

6. The initiator of claim 5, wherein the size of the micro initiation cavity comprises a diameter not exceeding approximately 0.1 of an inch.

7. The initiator of claim 5, wherein the size of the micro initiation cavity comprises an inside diameter ranging between approximately 0.03 and 0.06 of an inch.

8. The initiator of claim 5, wherein the size of the micro initiation cavity comprises an inside diameter of approximately 0.04 of an inch.

9. The initiator of claim 1, wherein the elongated electrode comprises a generally cylindrical configuration.

10. The initiator of claim 9, wherein the elongated electrode comprises an outside diameter not exceeding approximately 0.01 of an inch.

11. The initiator of claim 9, wherein the elongated electrode comprises an outside diameter ranging between approximately 0.002 and approximately 0.008 of an inch.

12. The initiator of claim 9, wherein the elongated electrode comprises an outside diameter of approximately 0.005 of an inch.

13. The initiator of claim 9, wherein the at least a portion of the elongated electrode comprises an axial length not exceeding approximately 0.1 of an inch.

14. The initiator of claim 9, wherein the at least a portion of the elongated electrode comprises an axial length ranging between approximately 0.02 and approximately 0.06 of an inch.

15. The initiator of claim 9, wherein the at least a portion of the elongated electrode comprises an axial length ranging between approximately 0.035 and approximately 0.045 of an inch.

16. The initiator of claim 9, wherein the elongated electrode is comprised of a stainless steel.

17. The initiator of claim 16, wherein the elongated electrode is comprised of a stainless steel comprising nickel and chromium.

18. The initiator of claim 17, wherein the elongated electrode is comprised of chromel-P thermocouple wire.

19. The initiator of claim 1, wherein the initiator body comprises an axially oriented cavity sized and configured for accommodating the electrode insulator.

20. The initiator of claim 19, wherein the electrode insulator is comprised of a ceramic material.

21. The initiator of claim 20, wherein the ceramic material is comprised of zirconia-based ceramic.

22. The initiator of claim 19, wherein the electrode insulator comprises a generally cylindrical configuration having an axial bore for encapsulating a portion of the elongated electrode.

23. The initiator of claim 22, wherein the electrode insulator comprises the axial bore directly contacting the elongated electrode so as to provide a hermetic seal about the portion of the elongated electrode encapsulated by the electrode insulator.

24. The initiator of claim 22, wherein the electrode insulator comprises an adhesive material disposed within the axial bore of the electrode insulator so as to provide a hermetic seal about the portion of the elongated electrode encapsulated by the electrode insulator.

25. The initiator of claim 24, wherein the adhesive material is comprised of STYCAST 2651-40 adhesive.

26. The initiator of claim 1, further comprising an electrode connector including an electrode holding portion sized and configured for holding the electrode insulator, the electrode connector being installable adjacent the connection end of the initiator body.

27. The initiator of claim 26, wherein the electrode connector comprises a threaded portion engagable within a complementary threaded region located adjacent the connection end of the initiator body.

28. The initiator of claim 1, wherein the initiator body is comprised of stainless steel.

29. The initiator of claim 1, wherein the initiator comprises a pyrotechnic material disposed within at least the micro initiation cavity so as to form a micro initiation column surrounding the exposed the at least a portion of the elongated electrode.

30. The initiator of claim 29, wherein the micro initiation column comprises at least one of B/KNO$_3$ and nitrocellulose.

31. The initiator of claim 29, wherein the micro initiation column comprises at least one of B/KNO$_3$ and nitrocellulose packed to a pressure of at least 1,000 psi.

32. The initiator of claim 29, wherein the micro initiation column comprises at least one of B/KNO$_3$ and nitrocellulose mixed with a plasticizer packed to a pressure of at least 1,200 psi.

33. The initiator of claim 29, wherein the micro initiation column comprises at least one of B/KNO$_3$ and nitrocellulose mixed with a selected amount of Laminac resin packed to a pressure of at least 1,500 psi.

34. An initiator for ignition of a pyrotechnic material comprising:
an initiator body including a connection end and an output end, the initiator body further including a micro initiation cavity sized and configured for accommodating a column of pyrotechnic material of a selected volume, the micro initiation cavity being in communication with the output end of the initiator body, and wherein the initiator body defines an axially oriented cavity sized and configured for accommodating an electrode insulator; and
an elongated electrode supported by the electrode insulator, at least a portion of the elongated electrode being exposed and centrally disposed within the micro initiation cavity so as not to be grounded to the initiator body and wherein the elongated electrode and the initiator body are configured for connection to an electrical circuit capable of generating a high voltage output of sufficient strength to cause the elongated electrode to initiate the ignition of the pyrotechnic material to be disposed in at least the micro initiation cavity;
wherein the electrode insulator exhibits a generally cylindrical configuration having an axial bore for encapsulating a portion of the elongated electrode and wherein adhesive material is disposed within the axial bore of the electrode insulator so as to provide a hermetic seal about the portion of the elongated electrode encapsulated by the electrode insulator.

35. An initiator for ignition of a pyrotechnic material comprising:
an initiator body including a connection end and an output end, the initiator body further including a micro initiation cavity sized and configured for accommodating a column of pyrotechnic material of a selected volume, the micro initiation cavity being in communication with the output end of the initiator body;
an elongated electrode supported by an electrode insulator, at least a portion of the elongated electrode being exposed and centrally disposed within the micro initiation cavity so as not to be grounded to the initiator body and wherein the elongated electrode and the initiator body are configured for connection to an electrical circuit capable of generating a high voltage output of sufficient strength to cause the elongated electrode to initiate the ignition of the pyrotechnic material to be disposed in at least the micro initiation cavity;
an electrode connector including an electrode holding portion sized and configured for holding the electrode insulator, the electrode connector being installable adjacent the connection end of the initiator body, wherein the electrode connector comprises a connection end configured to accommodate a detachable coaxial cable connector.

36. An initiator for ignition of a pyrotechnic material comprising:
an initiator body including a connection end and an output end, the initiator body further including a micro initiation cavity sized and configured for accommodating a column of pyrotechnic material of a selected volume, the micro initiation cavity being in communication with the output end of the initiator body;
an elongated electrode supported by an electrode insulator, at least a portion of the elongated electrode being exposed and centrally disposed within the micro initiation cavity so as not to be grounded to the initiator body and wherein the elongated electrode and the initiator body are configured for connection to an electrical circuit capable of generating a high voltage output of sufficient strength to cause the elongated electrode to initiate the ignition of the pyrotechnic material to be disposed in at least the micro initiation cavity;

a pyrotechnic material disposed within at least the micro initiation cavity so as to form a micro initiation column surrounding the exposed the at least a portion of the elongated electrode; and at least one spacer having an aperture sized and configured for allowing at least the exposed the at least a portion of the elongated electrode to pass therethrough disposed in the micro initiation cavity.

37. The initiator of claim 36, wherein the at least one spacer is comprised of mica.

38. The initiator of claim 36, wherein the at least one spacer comprises a plurality of mica spacers.

39. The initiator of claim 36, wherein the pyrotechnic material is further disposed in an output charge cavity so as to form an output charge volume in communication with the micro initiation column.

40. The initiator of claim 39, wherein at least one of the micro initiation column and the output charge volume comprises at least one of $B/KNO_3$, nitrocellulose, unavalium and unobtainium.

41. The initiator of claim 39, wherein at least one of the micro initiation column and the output charge volume comprises at least one of $B/KNO_3$ and nitrocellulose packed to a pressure of at least approximately 1,000 psi.

42. The initiator of claim 39, wherein the micro initiation column and the output charge volume each comprise at least one of $B/KNO_3$ and nitrocellulose mixed with a plasticizer and packed to a pressure of at least approximately 1,200 psi.

43. The initiator of claim 39, wherein the micro initiation column and the output charge volume each comprise at least one of $B/KNO_3$ and nitrocellulose mixed with a selected amount of Laminac resin packed to a pressure of at least approximately 1,500 psi.

44. The initiator of claim 43, wherein the at least one spacer is comprised of mica.

45. The initiator of claim 39, further comprising at least one closure being disposed proximate the output end of the initiator body to hermetically seal at least the output charge volume.

46. The initiator of claim 45, wherein the at least one closure comprises a stainless steel closure cup.

47. The initiator of claim 46, wherein the at least one closure is welded into position.

48. The initiator of claim 45, further comprising an output charge cavity spacer disposed within the output charge cavity for reducing the volume thereof.

49. The initiator of claim 45, wherein the at least one closure comprises rupture control geometry for ensuring peripheral detainment of closure residue upon activation of the initiator.

50. A high voltage arm/fire device for initiating the ignition of a charge of pyrotechnic material, comprising:

an initiator body including a connection end and an output end, the initiator body including a micro initiation cavity exhibiting a generally cylindrical configuration sized and configured for accommodating a column of pyrotechnic material of a first selected volume, the micro initiation cavity being in communication with the output end of the initiator body, the initiator body further including an output charge cavity adjacent the output end and intermediately positioned between the output end and the micro initiation cavity so as to be in communication with the micro initiation cavity, the output charge cavity configured to be generally cylindrical and sized for accommodating a boost charge of pyrotechnic material of a second selected volume;

an elongated electrode supported by an electrode insulator, at least a portion of the elongated electrode being exposed and disposed within the micro initiation cavity so as not to be grounded to the initiator body; and an arm/fire electrical circuit having a high voltage output configured for connection to the elongated electrode and the initiator body and capable of generating a high voltage output of sufficient strength to cause the elongated electrode to initiate the ignition of a pyrotechnic material to be disposed in at least the micro initiation cavity, the arm/fire electrical circuit being configured for coupling with the elongated electrode and the initiator body, the arm/fire circuit comprising:

at least one arm-circuit for inducing an autotransformer to generate a first current; and at least one fire-circuit for inducing the first current to collapse to enable the arm/fire electrical circuit to provide at least one pulse of high voltage at the high voltage output.

51. The high voltage arm/fire device of claim 50, wherein the at least one fire-circuit of the arm/fire electrical circuit further comprises an optical-actuated switch for passing current to ground upon the at least one fire-circuit receiving a fire command.

52. The high voltage arm/fire device of claim 50, wherein the autotransformer of the arm/fire electrical circuit is configured to effect a voltage transformation of approximately 1:10.

53. The high voltage arm/fire device of claim 50, wherein at least one of the at least one arm circuit and the at least one fire circuit of the arm/fire electrical circuit operates on an input voltage of approximately 28 volts DC.

54. The high voltage arm/fire device of claim 50, wherein the arm/fire electrical circuit is configured for generating the high voltage output of at least approximately 500V.

55. The high voltage arm/fire device of claim 50, wherein the arm/fire electrical circuit is configured for generating the high voltage output of at least approximately 1,500V.

56. The high voltage arm/fire device of claim 50, wherein the pyrotechnic material comprises at least one plasticizer mixed therein.

57. The high voltage arm/fire device of claim 56, wherein the at least one plasticizer comprises laminac resin.

58. The high voltage arm/fire device of claim 50, wherein the elongated electrode comprises a generally cylindrical shape and wherein the elongated electrode comprises stainless steel.

59. The high voltage arm/fire device of claim 50, wherein the elongated electrode comprises an axial length not exceeding approximately 0.06 of an inch.

60. The high voltage arm/fire device of claim 50, wherein the elongated electrode comprises an axial length ranging between approximately 0.030 and 0.045 of an inch.

61. The high voltage arm/fire device of claim 50, wherein the elongated electrode comprises an outside diameter not exceeding approximately 0.01 of an inch.

62. The high voltage arm/fire device of claim 50, wherein the elongated electrode comprises an outside diameter ranging from approximately 0.002 to approximately 0.008 of an inch.

63. The high voltage arm/fire device of claim 50, wherein the elongated electrode comprises an outside diameter of approximately 0.005 of an inch.

64. The high voltage arm/fire device of claim 50, wherein the elongated electrode is comprised of a stainless steel including nickel and chromium and wherein the initiator body is comprised of stainless steel.

65. The high voltage arm/fire device of claim 50, wherein the initiator body comprises an axially positioned cavity sized and configured to accommodate the electrode insulator, the electrode insulator constructed from at least one ceramic-based material.

66. The high voltage arm/fire device of claim 65, wherein the electrode insulator includes an axial bore sized and configured to hermetically encompass at least a portion of the elongated electrode therein.

67. The high voltage arm/fire device of claim 66, further comprising an adhesive disposed within the axial bore of the electrode insulator.

68. The high voltage arm/fire device of claim 50, wherein at least the initiator body of the high voltage arm/fire device is adapted for installation upon a solid propellant motor.

69. The high voltage arm/fire device of claim 68, wherein the solid propellant motor is adapted for installation within at least one of a missile and a rocket.

70. The high voltage arm/fire device of claim 69, wherein the at least the initiator body of the high voltage arm/fire device is adapted for installation through a bulkhead of the solid propellant motor.

71. The high voltage arm/fire device of claim 50, wherein at least the initiator body of the high voltage arm/fire device is adapted for installation upon a charge of pyrotechnic material contained within a detonative device.

72. A high voltage arm/fire device for initiating the ignition of a charge of pyrotechnic material, comprising:
   an initiator body including a connection end and an output end, the initiator body including a micro initiation cavity exhibiting a generally cylindrical configuration sized and configured for accommodating a column of pyrotechnic material of a first selected volume, the micro initiation cavity being in communication with the output end of the initiator body, the initiator body further including an output charge cavity adjacent the output end and intermediately positioned between the output end and the micro initiation cavity so as to be in communication with the micro initiation cavity, the output charge cavity configured to be generally cylindrical and sized for accommodating a boost charge of pyrotechnic material of a second selected volume,
   an elongated electrode supported by an electrode insulator, at least a portion of the elongated electrode being exposed and disposed within the micro initiation cavity so as not to be grounded to the initiator body and wherein the elongated electrode and the initiator body are connectable to an arm/fire electrical circuit; and
   the arm/fire electrical circuit capable of generating a high voltage output of sufficient strength to cause the elongated electrode to initiate the ignition of a pyrotechnic material to be disposed in at least the micro initiation cavity, wherein the high voltage arm/fire device is configured to require at least approximately 500 volts to be applied across the elongated electrode and an inner surface of the micro initiation cavity to cause the elongated electrode to initiate the ignition of a pyrotechnic material to be disposed in at least the micro initiation cavity.

73. The high voltage arm/fire device of claim 72, wherein the high voltage arm/fire device is configured to require from about 500 volts to about 4,000 volts of electrical energy to be applied across the elongated electrode and an inner surface of the micro initiation cavity to cause the elongated electrode to initiate the ignition of a pyrotechnic material to be disposed in at least the micro initiation cavity.

74. The high voltage arm/fire device of claim 73, wherein the pyrotechnic material comprises at least one of $BKNO_3$ and nitrocellulose.

75. A high voltage arm/fire device for initiating the ignition of a charge of pyrotechnic material, comprising:
   an initiator body including a connection end and an output end, the initiator body including a micro initiation cavity exhibiting a generally cylindrical configuration sized and configured for accommodating a column of pyrotechnic material of a first selected volume, the micro initiation cavity being in communication with the output end of the initiator body, the initiator body further including an output charge cavity adjacent the output end and intermediately positioned between the output end and the micro initiation cavity so as to be in communication with the micro initiation cavity, the output charge cavity configured to be generally cylindrical and sized for accommodating a boost charge of pyrotechnic material of a second selected volume;
   an elongated electrode supported by an electrode insulator, at least a portion of the elongated electrode being exposed and disposed within the micro initiation cavity so as not to be grounded to the initiator body and wherein the elongated electrode and the initiator body are connectable to an arm/fire electrical circuit; and
   the arm/fire electrical circuit capable of generating a high voltage output of sufficient strength to cause the elongated electrode to initiate the ignition of a pyrotechnic material to be disposed in at least the micro initiation cavity, wherein at least one of the micro initiation cavity and the output charge cavity contains the pyrotechnic material packed therein at a pressure of at least about 1,000 psi and further comprising at least one hermetic closure secured adjacent the output end of the initiator body.

76. The high voltage arm/fire device of claim 75, wherein at least one of the micro initiation cavity and the output charge cavity contains the pyrotechnic material packed therein at a pressure of about 1,500 psi and further comprising at least one hermetic closure secured adjacent the output end of the initiator body.

77. The high voltage arm/fire device of claim 75, wherein the pyrotechnic material comprises at least one of $BKNO_3$ and nitrocellulose.

* * * * *